United States Patent [19]
Honda et al.

[11] Patent Number: 6,165,832
[45] Date of Patent: Dec. 26, 2000

[54] METHOD FOR MANUFACTURING A CAPACITOR

[75] Inventors: Kazuyoshi Honda, Takatsuki; Noriyasu Echigo, Kobe; Masaru Odagiri, Kawanishi; Nobuki Sunagare, Matsue; Toru Miyake, Hikawa-gun, all of Japan

[73] Assignee: Matsushita Electric Industrial Co., Ltd., Osaka, Japan

[21] Appl. No.: 09/332,747

[22] Filed: Jun. 14, 1999

[30] Foreign Application Priority Data

Jun. 15, 1998 [JP] Japan .................................. 10-166539

[51] Int. Cl.⁷ .............................................. H01L 21/8242
[52] U.S. Cl. ............................................ 438/239; 438/239
[58] Field of Search ................ 438/3, 239, 386, 438/393; 427/576

[56] References Cited

U.S. PATENT DOCUMENTS 5,663,089  9/1997  Tomozawa et al. ..................... 427/576

FOREIGN PATENT DOCUMENTS 0 808 667  11/1997  European Pat. Off. .

*Primary Examiner*—David Nelms
*Assistant Examiner*—David Nhu
*Attorney, Agent, or Firm*—Merchant & Gould P.C.

[57] ABSTRACT

A method for manufacturing a capacitor includes the step of depositing metal thin film layers and resin layers alternating with each other, thereby forming a layered product. The thickness of the resin layer and the metal thin film or the width of margins are measured during the deposition. At a predetermined point in the process of the deposition, the number of layers to be deposited further is determined, based on the measured values and an intended electrostatic capacitance or deposition thickness. The thus obtained capacitor has the intended electrostatic capacitance or deposition thickness with a small dispersion.

29 Claims, 16 Drawing Sheets

METHOD FOR MANUFACTURING A CAPACITOR

BACKGROUND OF THE INVENTION

1. Field of the Invention

The present invention relates to a method for manufacturing a capacitor. More specifically, the present invention relates to the following method for manufacturing a capacitor. A first protective layer, an element layer, which generates capacitance as a capacitor, and a second protective layer are deposited sequentially on a rotating supporting base. The first protective layer comprises resin layers. The element layer comprises resin layers alternating with metal thin film layers. The second protective layer comprises resin layers. At a point in the process of the deposition, the number of layers to be deposited further is determined, based on the deposition status up to that point, to provide a capacitor having a desired thickness of each layer, a desired entire thickness or a desired electrostatic capacitance.

2. Description of the Prior Art

A method for manufacturing a layered product having alternating resin layers and metal thin film layers, wherein depositing a resin layer and depositing a metal thin film layer are performed one after the other, and repeatedly applied to a rotating supporting base, is known, for example, from Publication of European Patent Application EP 0 808 667, which also discloses a compact capacitor with large capacitance by providing external electrodes in the thus obtained layered product.

Referring to the drawings, the following is an example of a method for manufacturing a layered product for a capacitor comprising resin layers and metal thin film layers.

FIG. 15 is a cross-sectional drawing schematically showing an example of a manufacturing apparatus using a conventional method for manufacturing a layered product for a capacitor.

An apparatus 900 for manufacturing a layered product includes a rotatable cylindrical can roller 910, an apparatus 920 for forming a resin layer, a resin curing device 940, and an apparatus 930 for forming a metal thin film, which are arranged near the perimeter of the can roller 910, inside a vacuum tank 901. The reduced pressure inside the vacuum tank 901 is sustained by a vacuum pump 902.

Liquid resin layer material is supplied to the apparatus 920 for forming a resin layer with a resin-material supply tube 921. The fluid flow can be regulated with a fluid-flow regulation valve 922. The fluid resin layer material is accumulated in a heating container 923, heated, evaporated, and deposited on the surface of a heating roll 925, which rotates in the direction indicated by arrow 924. Then, it is again evaporated, and deposited on the surface of the can roller 910, which rotates in the direction indicated by arrow 911.

Since the can roller 910 has been cooled below the condensation point of the resin layer material, the deposited resin layer material is cooled by the surface of the can roller 910, so that a solid resin layer made of the resin layer material is formed.

The resulting resin layer is cured by, for example irradiation of UV light from the resin curing device 940.

Then, the apparatus 930 for forming a metal thin film forms an aluminum thin film on the surface of the resin layer by vapor deposition. The metal thin film can be formed by using an oil margin method, where a strip of oil is deposited on the surface of the resin layer so as to prevent the formation of the meal thin film in the portion covered by the oil strip for a margin (insulating region). Thus, a striped metal thin film layer can be formed.

Thus, rotating the can roller 910, the apparatus 920 for forming a resin layer and the apparatus 930 for forming a metal thin film form resin layers alternating with metal thin film layers on the circumferential surface of the can roller 910, and a layered product comprising resin layers and metal thin film layers is manufactured.

The thus obtained layered product is cut and provided with external electrodes, whereby a capacitor as shown in FIG. 16 can be manufactured. The capacitor 950 shown in FIG. 16 includes a layered product comprising resin layers 951 and metal thin film layers 952 laminated alternately and a pair of external electrodes 954 formed on the opposing sides of the layered product. The external electrodes 954 are connected electrically to the metal thin film layers 952. The metal thin film layer 952 formed on each of the resin layer 951 is divided into two regions that are electrically insulated from each other by a striped margin 953 extending in the depth direction of the drawing. Therefore, different electric potentials are supplied to the pair of external electrodes 954, so that the capacitor 950 can function as a capacitor having the resin layers 951 as a dielectric layer.

Considerable R&D efforts have been invested in this method, since with this method, a resin layer thickness of about 0.05–1 $\mu$m, and a metal thin film layer thickness of about 20–100 nm can be attained. A more compact capacitor with larger capacitance can be manufactured with lower production costs, compared with a conventional capacitor obtained by laminating metallized films obtained by forming a metal thin film layer on a polymer film by vapor deposition.

With acute technological development competitions, uniform components with high quality are in demand increasingly. This applies to the field of capacitors, and there is a need for compact capacitors with large capacitance and uniform and constant quality.

Under these circumstances, the above-described method hardly can achieve intended thicknesses of resin layers and metal thin film layers and an intended width of margins stably. The thicknesses of these layers and the width of margins can vary with various factors. The thickness of the layers can be affected, for example, by the amount of resin layer material or metal material evaporated. Especially, since the resin layer material is polymeric, it is much more difficult to maintain the amount of the resin material evaporated constant all the time than to control the amount of the metal material evaporated. Further, the width of the margin can be affected by the width of the patterning material (oil) applied to the surface of the resin layer or the amount of the material applied.

The thickness of the resin layer affects the capacitance and the total thickness of a capacitor to be obtained. The thickness of the metal thin film affects the total thickness of a capacitor to be obtained. Therefore, without controlling the thickness of each of the layers sufficiently, the capacitance and the total thickness of the obtained capacitor would be significantly outside of a targeted value, and the dispersion thereof would be outside of an intended acceptable range.

Further, the width of the margin is correlated closely to the area where the metal thin film layers for functioning as electrodes of the capacitor are formed. Therefore, without controlling the width of the margin sufficiently, the capacitance of the obtained capacitor would be significantly outside of a targeted value, and the dispersion thereof would be outside of an intended acceptable range.

The deviation from the targeted value of the electrostatic capacitance of the obtained capacitor or the dispersion thereof influences the performance of a product having the capacitor incorporated therein significantly. Moreover, the deviation from the targeted value of the outer size (thickness) of the obtained capacitor or the dispersion thereof is a detriment to the mounting onto a circuit substrate or the like.

Furthermore, unexpected variations in the thickness of deposited layers or the width of margins occurring in the process of the deposition may not be detected, or even if they can be detected, it may not be possible to accommodate the variations sufficiently in the subsequent processes in the deposition of the layers. In this case, the whole layered product formed on the can roller 910 becomes a defect, thus resulting in a large loss.

Furthermore, a protective layer comprising resin layers and/or a reinforcement layer comprising metal thin film layers and resin layers laminated alternately may be formed on at least one side of an element layer, if necessary. These layers are formed in order to protect the element layer, improve the adhesion strength of the external electrodes or the like. The thickness of the protective layer and/or the reinforcement layer makes up 10 to 20% of the whole thickness of the capacitor, which is large. Therefore, without controlling the resin layer and the metal thin film layers in these layers sufficiently, the functions as the protective layer or the reinforcement layer cannot be fulfilled sufficiently. In addition, the total thickness of the obtained capacitor would be significantly outside of a targeted value, and the dispersion thereof would be outside of an intended acceptable range.

SUMMARY OF THE INVENTION

Therefore, with the foregoing in mind, it is an object of the present invention to provide a method for manufacturing a capacitor using a layered product obtained by depositing resin layers and metal thin film layers sequentially on a rotating supporting base, which is suitable for industrial production, and achieves an intended electrostatic capacitance of the capacitor and intended thicknesses and reduces dispersion thereof, so that constant quality as required can be maintained.

A method for manufacturing a capacitor of a first embodiment of the present invention includes the steps of depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element; cutting the capacitor base element; and forming external electrodes. The thickness of each deposited resin layer is measured during the deposition for the first protective layer. A check point is provided at a predetermined point in the process of the deposition for the first protective layer, and the number of layers to be deposited further for the first protective layer is determined, based on the measured thickness of the resin layer and the number of deposited resin layers up to the check point and the intended thickness of the first protective layer. This embodiment allows capacitors including the first protective layer having a desired deposition thickness to be produced steadily. Therefore, the functions expected from the first protective layer can be displayed sufficiently so that capacitors with desired characteristics can be obtained.

A method for manufacturing a capacitor of a second embodiment of the present invention includes the steps of depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element; cutting the capacitor base element; and forming external electrodes. The thicknesses of each deposited metal thin film layer and each deposited resin layer in the element layer are measured during the deposition for the element layer. A check point is provided at a predetermined point in the process of the deposition for the element layer. The number of layers to be deposited further for the element layer is determined, based on the measured thickness of the resin layer in the element layer and the number of deposited resin layers for the element layer up to the check point and the intended capacitance as a capacitor. This embodiment allows capacitors having a desired capacitance to be produced steadily.

A method for manufacturing a capacitor of a third embodiment of the present invention includes the steps of depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element; cutting the capacitor base element; and forming external electrodes. The width of each margin is measured during the deposition for the element layer. A check point is provided at a predetermined point in a process of the deposition for the element layer. The number of layers to be deposited further for the element layer is determined, based on an opposing area of the metal thin film layer calculated from the measured width of the margin and the number of deposited resin layers for the element layer up to the check point and the intended capacitance as a capacitor. This embodiment allows capacitors having a desired capacitance to be produced steadily.

A method for manufacturing a capacitor of a fourth embodiment of the present invention includes the steps of depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element; cutting the capacitor base element; and forming external electrodes. The thicknesses of each deposited metal thin film layer and each deposited resin layer are measured during the deposition. A check point is provided at a predetermined point in the process of the deposition for the second protective layer. The number of layers to be deposited further for the second protective layer is determined, based on the measured thicknesses of the metal thin film layer and the resin layer and the number of deposited layers up to the check point and the intended thickness of the capacitor. This embodiment allows capacitors having a desired entire thickness to be produced steadily.

A method for manufacturing a capacitor of a fifth embodiment of the present invention includes the steps of depositing a first protective layer, a first reinforcement layer, an element layer for generating capacitance as a capacitor, and a second protective layer sequentially on a rotating supporting base; the first protective layer comprising resin layers, the first reinforcement layer comprising metal thin film layers and resin layers deposited alternately, the element layer comprising metal thin film layers divided by a margin and resin layers deposited alternately, the second protective layer comprising resin layers, thereby forming a capacitor base element; cutting the capacitor base element; and forming external electrodes. The thicknesses of each deposited metal thin film layer and each deposited resin layer in the first reinforcement layer are measured during the deposition for the first reinforcement layer. A check point is provided at a predetermined point in the process of the deposition for the first reinforcement layer. The number of layers to be deposited further for the first reinforcement layer is determined, based on the measured thicknesses of the metal thin film layer and the resin layer in the first reinforcement layer and the number of deposited layers for the first reinforcement layer up to the check point and the intended thickness of the first reinforcement layer. This embodiment allows capacitors including the first reinforcement layer having a desired deposition thickness to be produced steadily. Therefore, the functions expected from the first reinforcement layer can be displayed sufficiently so that capacitors with desired characteristics can be obtained.

A method for manufacturing a capacitor of a sixth embodiment of the present invention includes the steps of depositing a first protective layer, an element layer for generating capacitance as a capacitor, a second reinforcement layer, and a second protective layer sequentially on a rotating supporting base; the first protective layer comprising resin layers, the element layer comprising metal thin film layers divided by a margin and resin layers deposited alternately, the second reinforcement layer comprising metal thin film layers and resin layers deposited alternately, the second protective layer comprising resin layers, thereby forming a capacitor base element; cutting the capacitor base element; and forming external electrodes. The thicknesses of each deposited metal thin film layer and each deposited resin layer in the second reinforcement layer are measured during the deposition for the second reinforcement layer. A check point is provided at a predetermined point in the process of the deposition for the second reinforcement layer. The number of layers to be deposited further for the second reinforcement layer is determined, based on the measured thicknesses of the metal thin film layer and the resin layer in the second reinforcement layer and the number of deposited layers for the second reinforcement layer up to the check point and the intended thickness of the second reinforcement layer. This embodiment allows capacitors including the second reinforcement layer having a desired deposition thickness to be produced steadily. Therefore, the functions expected from the second reinforcement layer can be displayed sufficiently so that capacitors with desired characteristics can be obtained.

In the first to fourth and sixth embodiments of the present invention, the first reinforcement layer including metal thin film layers and resin layers deposited alternately may be deposited after depositing the first protective layer and before depositing the element layer.

In the first to fifth embodiments of the present invention, the second reinforcement layer including metal thin film layers and resin layers deposited alternately may be deposited after depositing the element layer and before depositing the second protective layer.

These and other advantages of the present invention will become apparent to those skilled in the art upon reading and understanding the following detailed description with reference to the accompanying figures.

DESCRIPTION OF THE PREFERRED EMBODIMENTS

The following is a description of a method for manufacturing a capacitor in accordance with the present invention, with reference to the accompanying drawings.

Figure 1:
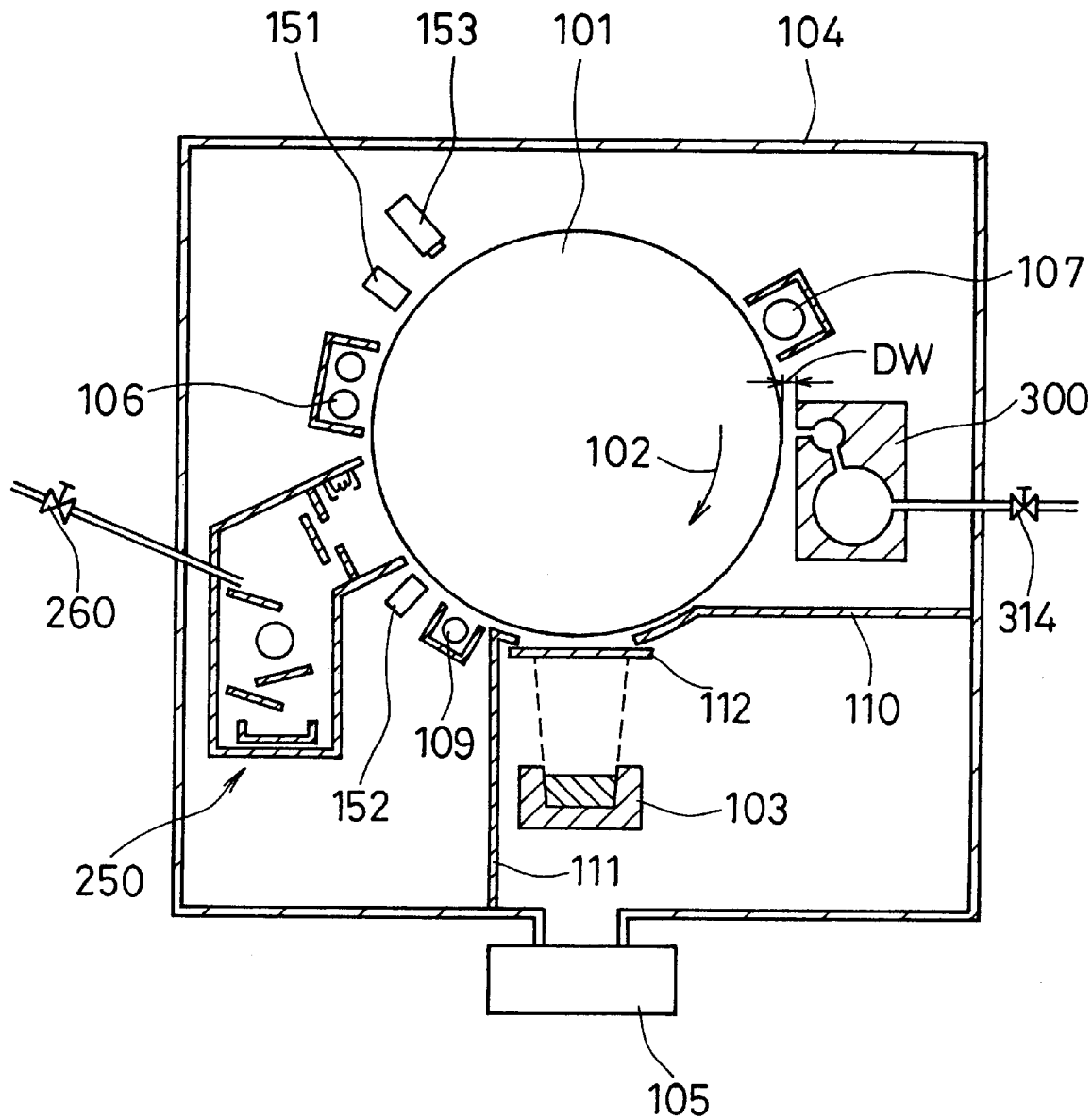
FIG. 1 is a cross-sectional drawing schematically showing an example of a manufacturing apparatus for performing a method for manufacturing a capacitor in accordance with the present invention.

FIG. 1 is a cross-sectional drawing schematically showing an embodiment of a manufacturing apparatus for performing the method for manufacturing a capacitor in accordance with the present invention.

An apparatus 103 for forming a metal thin film is arranged at a lower portion of a can roller 101, which rotates in direction of arrow 102 with constant angular velocity or constant circumferential velocity. An apparatus 250 for forming a resin layer is provided downstream in the rotation direction of the can roller 101. Furthermore, an apparatus 300 for applying patterning material, which forms margins (insulating regions), is provided upstream in the rotation direction of the can roller 101 with respect to the apparatus 103 for forming a metal thin film.

In this example, an apparatus 109 for removing patterning material is provided between the apparatus 103 for forming a metal thin film and the apparatus 250 for forming a resin layer. An apparatus 106 for curing resin and an apparatus 107 for treating a resin layer surface are provided between the apparatus 250 for forming a resin layer and the apparatus 300 for applying patterning material. However, these apparatuses can be arranged as appropriate.

The apparatuses are installed inside a vacuum container 104, wherein a vacuum is maintained with a vacuum pump 105. The vacuum inside the vacuum container 104 is about $2 \times 10^{-4}$ Torr, for example.

The circumferential surface of the can roller 101 is smooth, preferably mirror-finished, and cooled preferably to $-20°$ C. to $40°$ C., more preferably $-10°$ C. to $10°$ C. The rotation velocity can be adjusted freely, but preferably about 15 to 70 rpm, and the circumferential velocity preferably is 20 to 200 m/min. In this embodiment, a can roller 101 that is a cylindrical drum is used for the rotating supporting base, but a belt-shaped supporting base that runs between two or more rolls, a rotating disk, or other configurations are also possible.

The apparatus 250 for forming a resin layer evaporates or atomizes the resin layer material for forming the resin layers, and ejects it towards the can roller 101. The resin layer material is deposited on the circumferential surface of the can roller 101 and forms the resin layer. There are no particular limitations regarding the resin layer material, as long as it is suitable for forming a film by deposition after being evaporated or atomized. The resin layer material can be selected in accordance with the application for the layered product, but reactive monomer resins are preferable. To disperse the resin layer material, the resin layer material can be evaporated or atomized with, for example, heating means such as a heater, ultrasonic waves, or an atomizer. Especially, evaporating the resin layer material with heating means such as a heater is preferable.

Figure 2:
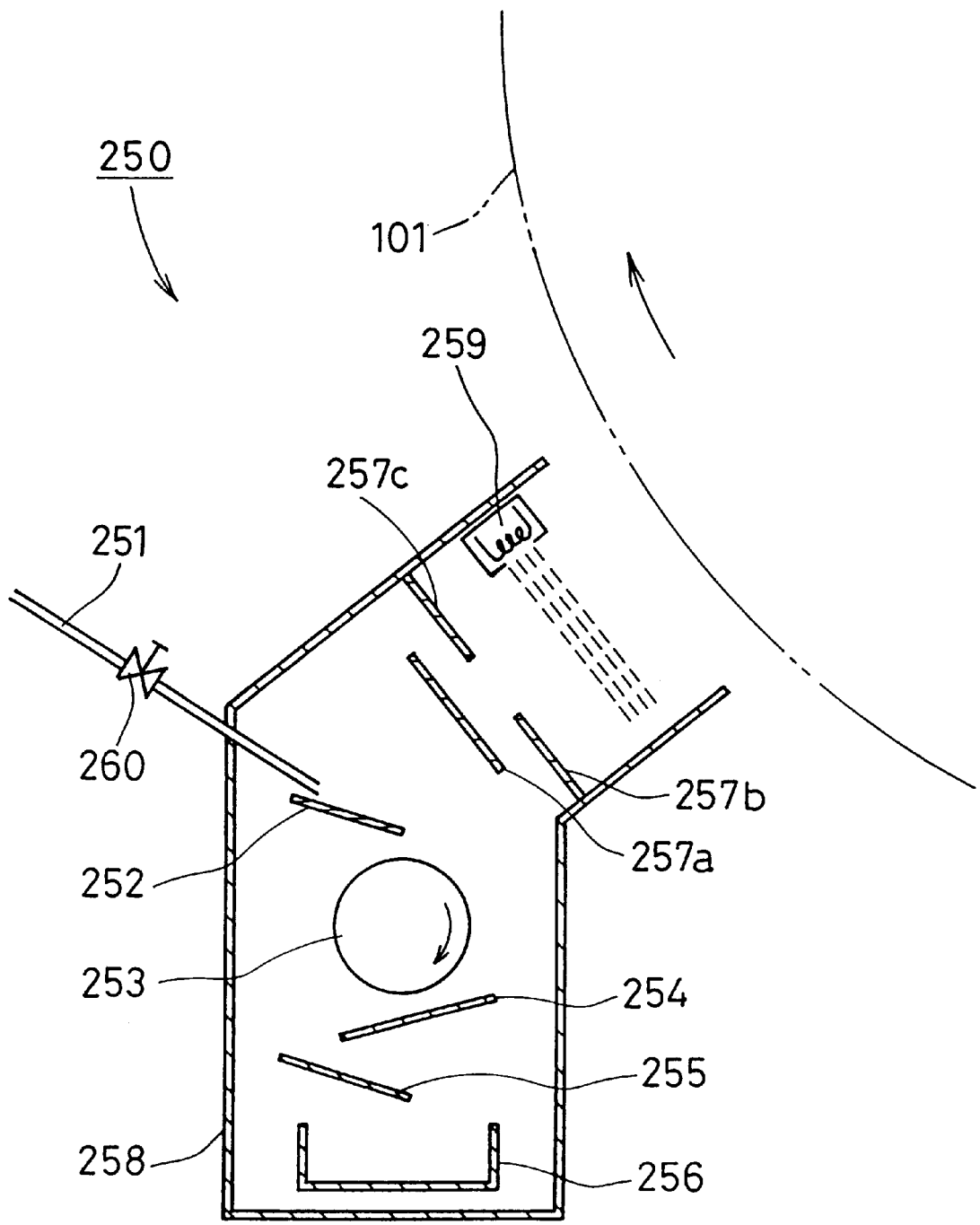
FIG. 2 is a cross-sectional drawing showing the internal structure of the apparatus for forming a resin layer in FIG. 1.

The apparatus 250 for forming a resin layer shown in FIG. 1 is an example of an apparatus for forming a resin layer by heating and evaporating a reactive monomer resin. FIG. 2 is a cross-sectional drawing showing its internal structure.

A liquid reactive monomer for forming the resin layer is introduced through a raw material supply tube 251, and dripped onto a heating plate A 252. The reactive monomer is heated on the heating plate A 252. A portion of the reactive monomer evaporates, whereas the portion of the reactive monomer that has not evaporated drops onto the heating drum 253. A portion of the reactive monomer on the heating drum 253 evaporates, whereas the portion of the reactive monomer that has not evaporated drops onto a heating plate B 254. Thereafter, the same operation is performed at the heating plate B 254 and a heating plate C 255. Then, the reactive monomer that has not evaporated yet drops into a heated cup 256 and evaporated gradually. The vapor monomer that has evaporated in such a manner forms a resin layer on the circumferential surface of the can roller 101.

Since the evaporated reactive monomer condenses on the can roller 101 to form the resin layer, a resin layer can be obtained that is much thinner and smoother than a resin layer where liquid resin layer material is applied directly to the can roller 101.

Furthermore, shielding plates 257a, 257b, and 257c are provided in the path where the evaporated reactive monomer reaches the can roller 101, whereby a resin layer with an even smoother surface can be formed. The reason for this is as follows: The liquid reactive monomer supplied by the raw material supply tube 251 is sometimes heated abruptly by the heating plate 252, so that large particles may develop and scatter. By employing the shielding plates that prohibit the reactive monomer from passing straight from the point of evaporation to the point of adherence on the surface of the can roller, the adherence of large particles can be greatly reduced, so that the surface of the resin layer becomes very smooth. Consequently, as long as the shielding plates serve to this end, there is no particular limitation to the shape and arrangement shown in FIG. 2.

Furthermore, in this embodiment, the apparatus 250 for forming a resin layer comprises a device 259 for irradiating a charged particle beam at a passing point of the reactive monomer, which charges the evaporated reactive monomer to achieve a resin layer with a smooth surface. The charged monomer particles are accelerated by electrostatic attraction, and due to the microscopic electrostatic repulsion during the deposition, they avoid the portions where charged particles already were deposited. Due to this mechanism, a very smooth resin film layer can be formed. The device for irradiating a charged particle beam also can be located downstream from the apparatus 109 for removing patterning material and upstream from the apparatus 250 for forming a resin layer, facing the circumferential surface of the can roller 101, where it charges the deposition surface.

Any device for irradiating a charged particle beam can be used, as long as it confers an electrostatic charge to the reactive monomer particles or to the deposition surface. For example, an electron beam irradiation device, an ion source irradiating an ion beam, or a plasma source can be used as the device for irradiating a charged particle beam.

Since the metal thin film layers of the present invention are very thin, the shape of the underlying layers, whereon the metal thin film layers are formed, is reflected by the surface of the metal thin film layers. It follows that since the surfaces of the resin layers formed as described above are very smooth, the surfaces of the metal thin film layers formed thereon also are very smooth.

The surface roughness of the resin layers of the element layer preferably is not more than 0.1 $\mu$m, even more preferably not more than 0.04 $\mu$m, and most preferably not more than 0.02 $\mu$m. For the metal thin film layers of the element layer, a surface roughness of not more than 0.1 $\mu$m is preferable, a surface roughness of not more than 0.04 $\mu$m is even more preferable, and a surface roughness of not more than 0.02 $\mu$m is most preferable. If the surface roughness is larger than that value, high-density integration becomes difficult, surface protrusions cause electric field concentrations, and the resin film layer may be leached or the metal thin film layer may be burnt. In this specification, "surface roughness" refers to the ten point average roughness Ra, measured with a contact-type surface meter having a diamond needle of 10 $\mu$m tip diameter and a 10 mg measuring load.

If necessary, the deposited resin layer material can be cured to a predetermined hardness with the apparatus 106 for curing resin. Examples of such a curing process are polymerization and/or crosslinking of the resin layer material. As the apparatus for curing resin, an electron beam irradiation device, a UV beam irradiation device, or a heat-curing device can be used, for example.

In the present invention, there is no particular limitation regarding the thickness of the resin layers in the element layer, but a thickness of not more than 1 μm is preferable, a thickness of not more than 0.7 μm is even more preferable, and a thickness of not more than 0.4 μm is most preferable. To fulfill the need for a capacitor that is small yet achieves high performance, it is preferable that the thickness of the resin layers of the capacitor obtained with the inventive method is small. For example, if the layered product obtained with the inventive manufacturing method is used as a capacitor, the capacitance of the capacitor increases in inverse proportion to the thickness of its dielectric layer, so that it is preferable that the resin layer serving as the dielectric layer is thin.

If necessary, the surface of the formed resin layer is treated with the apparatus 107 for treating a resin layer surface. For example, the surface of the resin layer can be activated with an oxygen plasma to increase the adhesiveness between the resin layer and the metal thin film layer.

The apparatus 300 for applying patterning material deposits a patterning material in a predetermined shape on the surface of the resin layer. At the portions where the patterning material has been deposited, no metal thin film is formed, so that these portions become margins (insulating regions). In this embodiment, a predetermined number of patternings of a predetermined shape is deposited at predetermined positions in the circumferential direction on the surface of the resin layer formed on the can roller 101.

To apply the patterning material, evaporated patterning material can be ejected from pinholes and condensed on the surface of the resin film layer, or liquid patterning material can be ejected onto the surface of the resin film layer. Besides these examples of contactless application methods, other application methods such as reverse coating or die coating are possible, but for the present invention, contactless application methods are preferable, because they prevent deformations of the resin layer and the metal thin film layer below it due to external pressure on the surface of the resin layer, which may cause rupture of the layers or chapping of the surface.

To apply the patterning material without contact to the surface of the resin layer, evaporated patterning material can be ejected from pinholes and condensed on the surface of the resin film layer, or liquid patterning material can be ejected from pinholes onto the surface of the resin film layer.

Figure 3:
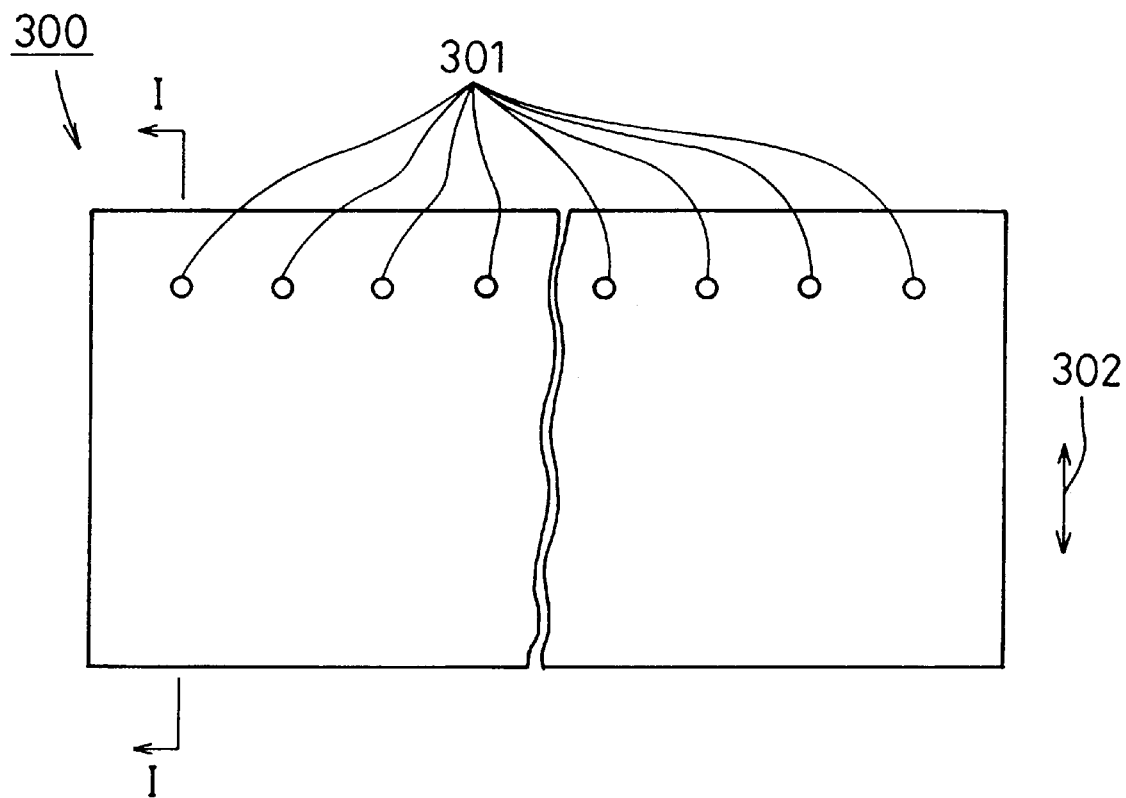
FIG. 3 is a plan view of the apparatus for applying patterning material in FIG. 1.

FIG. 3 is a plan view of the apparatus 300 for applying patterning material used for the manufacturing apparatus of FIG. 1. The apparatus 300 for applying patterning material in FIG. 3 ejects evaporated patterning material from pinholes. The advantages of this apparatus are that it reliably can apply a patterning material with sufficient thickness within a predetermined range, and is yet of a relatively simple structure.

On the front of the apparatus 300 for applying patterning material, a predetermined number of pinholes 301 are arranged at predetermined intervals. The apparatus 300 for applying patterning material is positioned in a manner that the pinholes 301 oppose the circumferential surface of the can roller 101, which is the deposition surface, and the direction indicated by arrow 302 matches the travel direction of the deposition surface. Then, the evaporated patterning material is ejected from the pinholes 301 so as to deposit the patterning material on the deposition surface, and condensed by cooling, whereby a deposition film of the patterning material is formed. Consequently, the intervals and the number of pinholes 301 in FIG. 3 correspond to the intervals and the numbers of strips of patterning material formed on the surface of the resin layer.

Figure 4:
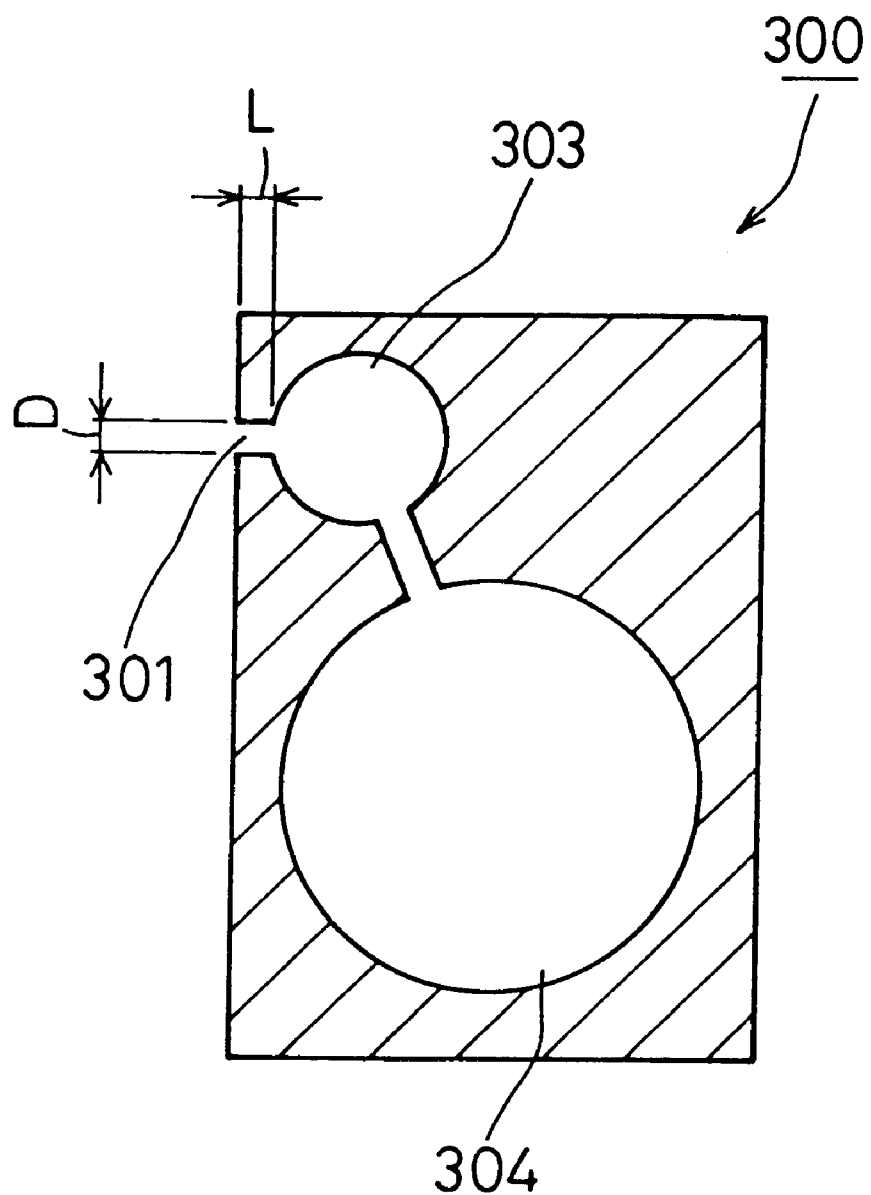
FIG. 4 is a cross-sectional drawing taken along I—I in FIG. 3 seen from the direction of the arrows.

FIG. 4 is a cross-sectional drawing of the apparatus 300 for applying patterning material taken along I—I in FIG. 3, and taken from the direction indicated by the arrows. The pinholes 301 are connected to a nozzle 303, which is connected to a container 304. In this example, patterning material is supplied to the container 304 from the outside.

The shape of the pinholes 301 of the nozzle can be round (circular), as shown in FIG. 3, but elliptical, elongated, rectangular or other shapes are also possible.

It is preferable that the supply of patterning material to the apparatus 300 for applying patterning material is performed as described in the following.

Figure 5:
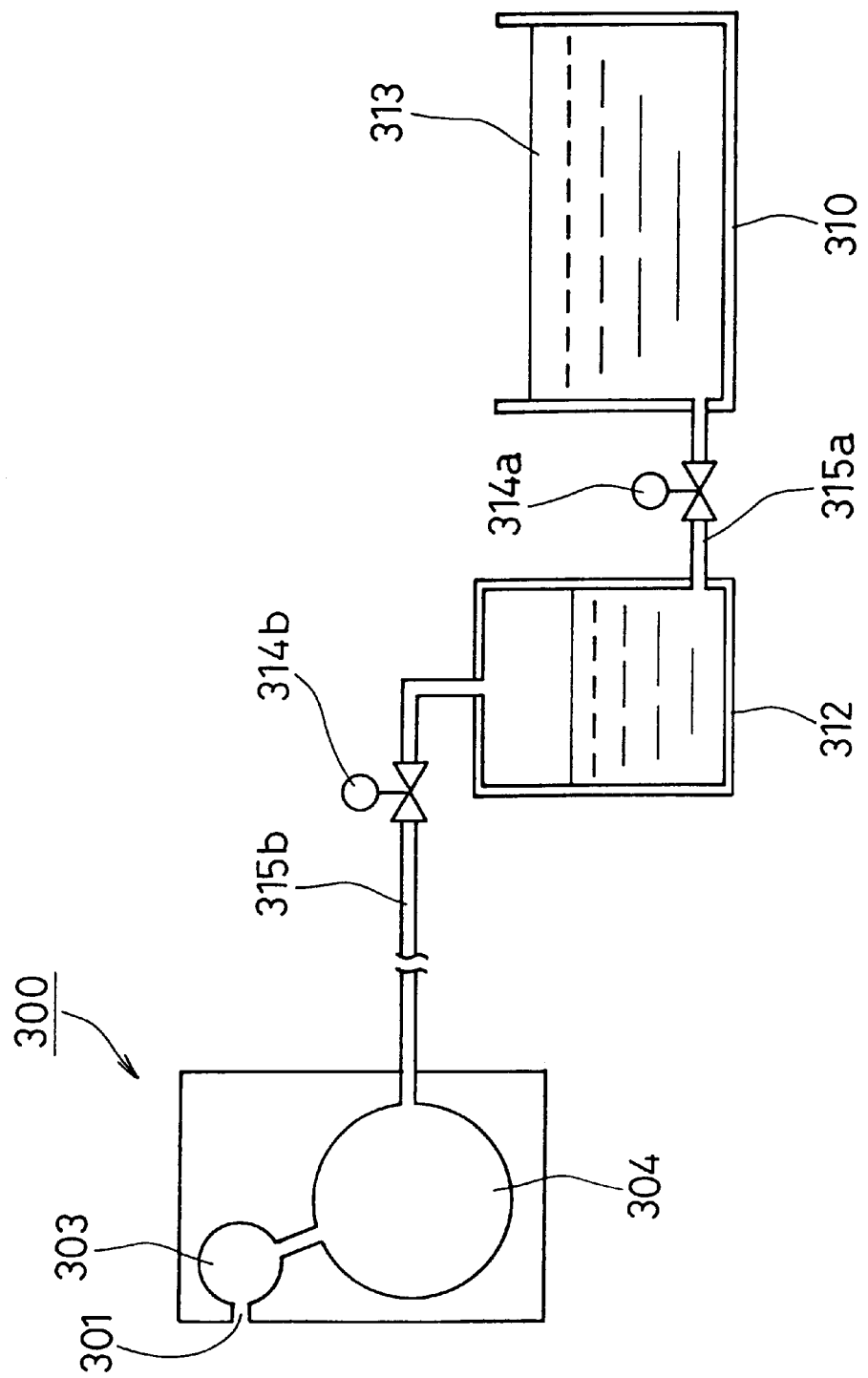
FIG. 5 is a diagram illustrating an example of how evaporated patterning material can be supplied to the apparatus for applying patterning material.

FIG. 5 is a diagram illustrating an example of how evaporated patterning material can be supplied to the apparatus for applying patterning material. Liquid patterning material 313 is accumulated in a reserve tank 310, and supplied to an evaporation device 312 through a pipe duct 315a having a valve 314a. The evaporation device 312 heats and evaporates the patterning material. The evaporated patterning material is transferred to the container 304 of the apparatus 300 for applying patterning material via a pipe duct 315b having a valve 314b. Then, the patterning material is ejected towards the deposition surface through the nozzle 303 and the pinholes 301.

The distance Dw between the pinholes of the apparatus 300 for applying patterning material and the deposition surface (resin layer surface) (see FIG. 1) preferably is not larger than 500 μm, more preferably not larger than 400 μm, most preferably not larger than 300 μm. As a lower limit for this distance, at least 50 μm is preferable, at least 100 μm is even more preferable, and at least 200 μm is most preferable. Thus, when the evaporated patterning material is ejected from the pinholes, it can be scattered while maintaining constant directionality. Consequently, in order to form the deposition film of patterning material reliably with the intended width and with distinct borders, a small distance between the pinholes and the deposition surface is preferable. On the other hand, when the distance between the pinholes and the deposition surface is too small, it becomes difficult to control the thickness of the deposition film, the difference between the thicknesses of the deposition film at a central portion and at a peripheral portion becomes large, and the proportion of vapor that does not adhere and is scattered becomes large. When the distance Dw is between 100 μm and 500 μm, the distance Dw is substantially proportional to the deposition width of the patterning material, so that it is possible to adjust the deposition width of the patterning material by the distance Dw. In other words, moving the apparatus for applying patterning material back or forth allows the deposition width of the patterning material to be varied.

The following is an explanation of a method for depositing liquid patterning material by ejecting it from pinholes.

Figure 6:
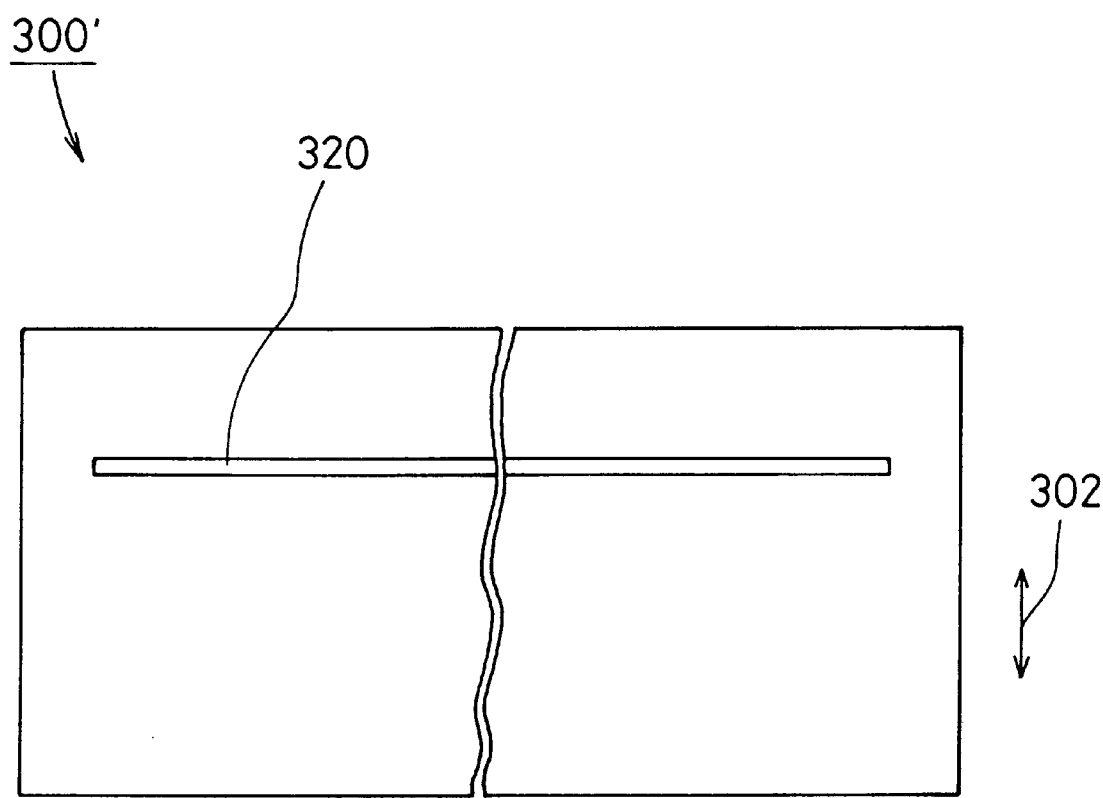
FIG. 6 is a plan view showing an example of an apparatus for applying patterning material that can spray liquid patterning material from pinholes.

FIG. 6 is a plan view showing an example of an apparatus 300' for applying patterning material that can spray liquid patterning material from pinholes. The apparatus 300' for applying patterning material is arranged in a manner that the direction indicated by arrow 302 matches the travel direction of the deposition surface. On the front face of the apparatus 300' for applying patterning material, a nozzle head 320 is arranged at right angles with the arrow direction 302. Pinholes are arranged on the surface of the nozzle head in predetermined intervals, and liquid patterning material is sprayed from the pinholes. The patterning material can be sprayed, for example, in form of droplets using a piezoelectric element.

In the inventive method for manufacturing a capacitor, a predetermined number of resin layers and metal thin film layers are formed on a rotating supporting base. If a patterning material is applied, it has to be applied every time immediately before forming the metal thin film layer. Consequently, if the number of layers is large, the distance Dw (see FIG. 1) between the pinholes and the deposition surface (that is, the surface of the resin layer) becomes gradually smaller. Therefore, it is preferable that the apparatus 300 for applying patterning material can be retracted in accordance with the progression of the deposition, so as to keep the distance between the pinholes and the deposition surface within the above-mentioned ranges.

Figure 7:
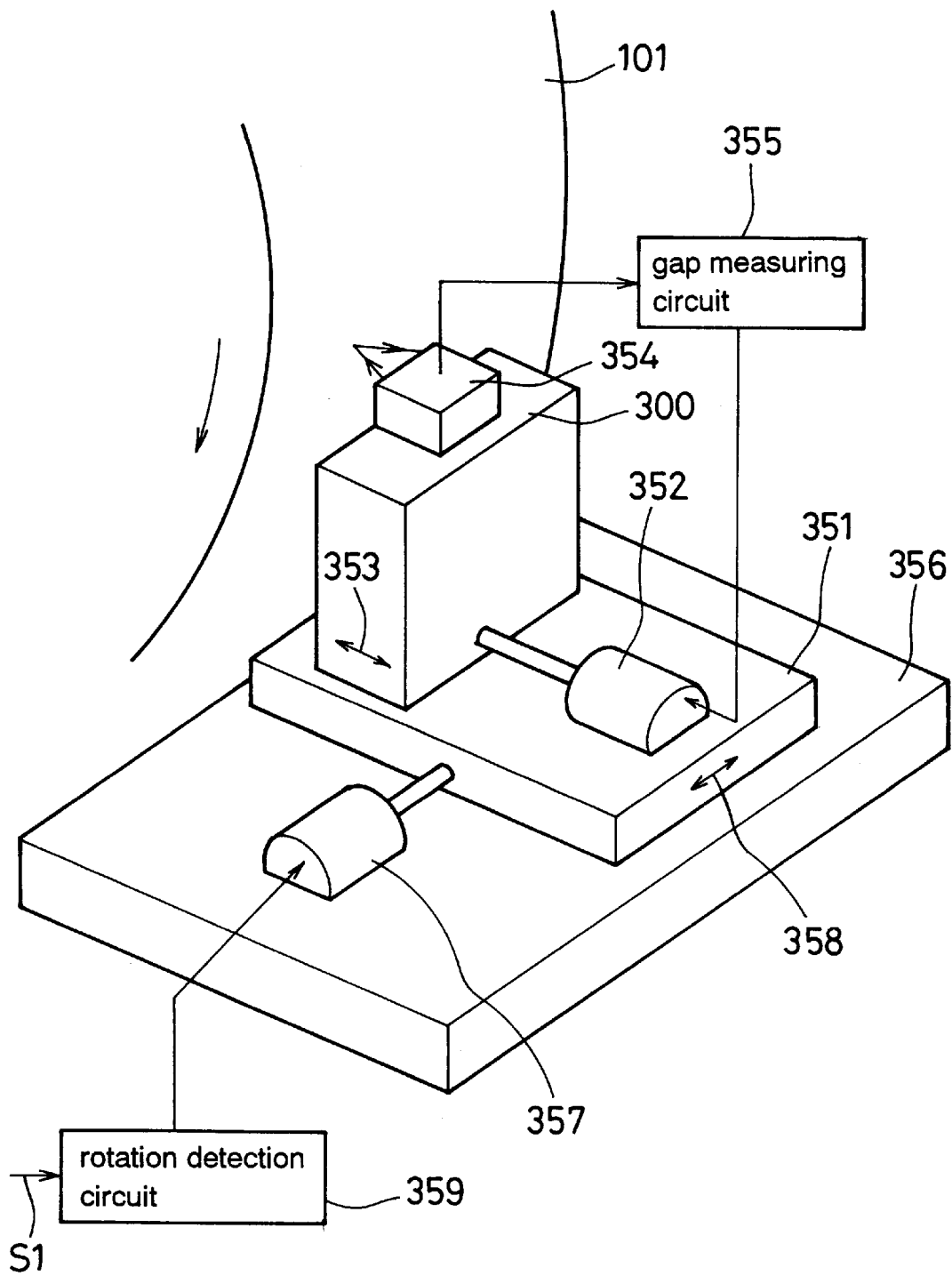
FIG. 7 is a diagram showing an example of a device for retracting the apparatus for applying a patterning material and moving the application position for patterning material.

The apparatus 300 for applying patterning material can be retracted for example with the apparatus shown in FIG. 7: An actuator 352 is fixed on a movable base 351. The apparatus 300 for applying patterning material is attached to the mobile end of the actuator 352. The actuator 352 can move the apparatus 300 for applying patterning material in the direction of arrow 353 on the movable base 351. A gap measuring device 354 for measuring the distance to the surface of the can roller 101 (or the circumferential surface of the layered product during the formation of layers) is arranged on the apparatus 300 for applying patterning material. A contactless measuring device, for example a measuring device using a laser, can be used for the gap measuring device 354. During the manufacturing of the layered product, the gap measuring device 354 keeps measuring the distance to the circumferential surface of the layered product on the surface of the can roller 101, and a signal corresponding to this measurement is sent to a gap measuring circuit 355. The gap measuring circuit 355 continuously checks whether the distance between the pinholes of the apparatus 300 for applying patterning material and the surface of the can roller 101 (or the circumferential surface of the layered product during the formation of layers) is within a predetermined range. When the deposition progresses and the gap measuring circuit 355 determines that this distance is smaller than the predetermined range, it instructs the actuator 352 to retract the apparatus 300 for applying patterning material a predetermined distance, and based on this instruction, the apparatus 300 for applying patterning material is retracted a predetermined distance. Thus, the distance Dw between the pinholes of the apparatus 300 for applying patterning material and the circumferential surface of the layered product on the can roller 101 always can be kept within a constant interval while the deposition progresses.

In the manufacturing method of the present invention, it is preferable that the position where the patterning material is applied can be modified appropriately during the manufacture of the layered product. For example, after each predetermined number of rotations of the rotating supporting base, the application position of the patterning material may be shifted a predetermined distance in a direction perpendicular to the travel direction of the deposition surface and within a plane that is parallel to the deposition surface of the rotating supporting base. Thus, a layered product can be obtained wherein resin layers and metal thin film layers are successively layered, and wherein the position of the margins varies for each layer. Thus, a capacitor using the resin layers as dielectric layers and the metal thin film layers sandwiching the dielectric layer as electrode having different potential can be realized easily.

Changes in the position where patterning material is applied can be realized by using an actuator 357 attached to a support base 356 and having its mobile end attached to a movable base 351 in the device shown in FIG. 7. The rotation of the can roller 101 is detected, and a rotation signal $S_1$ is sent to a rotation detection circuit 359. When the rotation detection circuit 359 has counted a predetermined number of rotations (for example one rotation), it instructs the actuator 357 to move the movable base 351 for a predetermined distance in a predetermined direction as indicated by arrow 358.

It is preferable that the patterning material comprises at least one oil of the group consisting of ester oils, glycol oils, fluorocarbon oils, and hydrocarbon oils. It is even more preferable that the patterning material is an ester oil, a glycol oil, or a fluorine oil. It is most preferable that the patterning material is a fluorine oil. When patterning materials other than the above patterning materials are used, the surface of the layers may be chapped, pinholes may appear in the resin layers or the metal thin film layers, or other problems such as instabilities in the border portions of the metal thin film layers (instabilities of the margin width) may occur.

The apparatus 103 for forming a metal thin film layer forms a metal thin film layer after depositing the patterning material where appropriate. The metal thin film can be formed by vapor deposition, sputtering, ion plating or other well-known methods. For the present invention, however, vapor deposition, especially electron beam vapor deposition, is preferable, because with this method, a film with excellent moisture resistance can be obtained with high productivity.

Possible materials for the metal thin film layer include aluminum, copper, zinc, nickel, their compounds, their oxides, and the oxides of their compounds. Of these, aluminum is preferable, because of its adhesiveness and low cost. The metal thin film layer also can include other components.

The apparatus 103 for forming a metal thin film layer of the present embodiment is maintained under a stronger vacuum by partition walls 110 and 111 provided inside the vacuum container 104. To stop the formation of the metal thin film layer, a shielding plate 112 that can be moved from the outside is provided between the apparatus 103 for forming a metal thin film and the can roller 101. With the manufacturing method of the present invention, a layered product can be manufactured that has alternating resin layers and metal thin film layers, but using the shielding plate 112, it is also possible to form regions where resin layers are formed successively, as in the case of deposition of a protective layer as described later.

Preferably, the thickness of the metal thin film layer is not more than 50 nm, more preferably 10–50 nm, most preferably 20–40 nm. Moreover, it is preferable that the film resistance is not more than 15$\Omega$/□, more preferably not more than 10$\Omega$/□, even more preferably 1–8$\Omega$/□, and most preferably 2–6$\Omega$/□. When the thickness is smaller than the above ranges, or the film resistance is too large, poor conductivity or drop of withstand voltage may result. Furthermore, when the thickness is larger than the above ranges, or the film resistance is too small, not only poor improvement of the electric characteristics, but also poor productivity and cost increase may result.

It is preferable that residual patterning material is removed after the metal thin film layer has been formed and before the resin layer is deposited. Most of the patterning material that has been deposited with the apparatus for applying a patterning material is removed by being again evaporated when the metal thin film layer is formed. However, a portion remains even after the formation of the metal thin film layer, and can contribute to a number of problems, such as chapping the deposited surface, causing pinholes (lack of deposition) in the resin layer or the metal thin film layer, or instabilities in the border portions of the metal thin film layer (instabilities of the margin width).

The removal of the patterning material can be performed by an apparatus 109 for removing patterning material, which is installed between the apparatus 103 for forming a metal thin film and the apparatus 250 for forming a resin layer. There is no particular limitation regarding how the patterning material is removed, and an appropriate method can be selected in accordance with the patterning material type. The patterning material can be removed by heat and/or decomposition, for example.

The method for manufacturing a capacitor according to the present invention includes the steps of, using the apparatus shown in FIG. 1, depositing a first protective layer comprising resin layers, an element layer that generates capacitance as a capacitor comprising resin layers and metal thin film layers deposited alternately, and a second protective layer comprising resin layers sequentially on the rotating supporting base 101, thereby forming a capacitor base element. If necessary, a first reinforcement layer may be formed between the first protective layer and the element layer. Moreover, a second reinforcement layer may be formed between the element layer and the second protective layer.

Herein, the protective layer includes only resin layers and does not contribute to the capacitance of the capacitor. The function of this protective layer is to prevent the element layer, which is a capacitance generation portion, from being damaged by heat or external pressure in the process of manufacturing a capacitor or in the process of mounting the capacitor on a printed circuit board. Also regarding an increased adhesion strength with the external electrodes, the resin layer displays a certain effect, although not as much as a metal thin film layer. Therefore, the deposition thickness or the number of layers for the protective layer affects the protective function for the element layer and the adhesion strength with the external electrodes.

Figure 16:
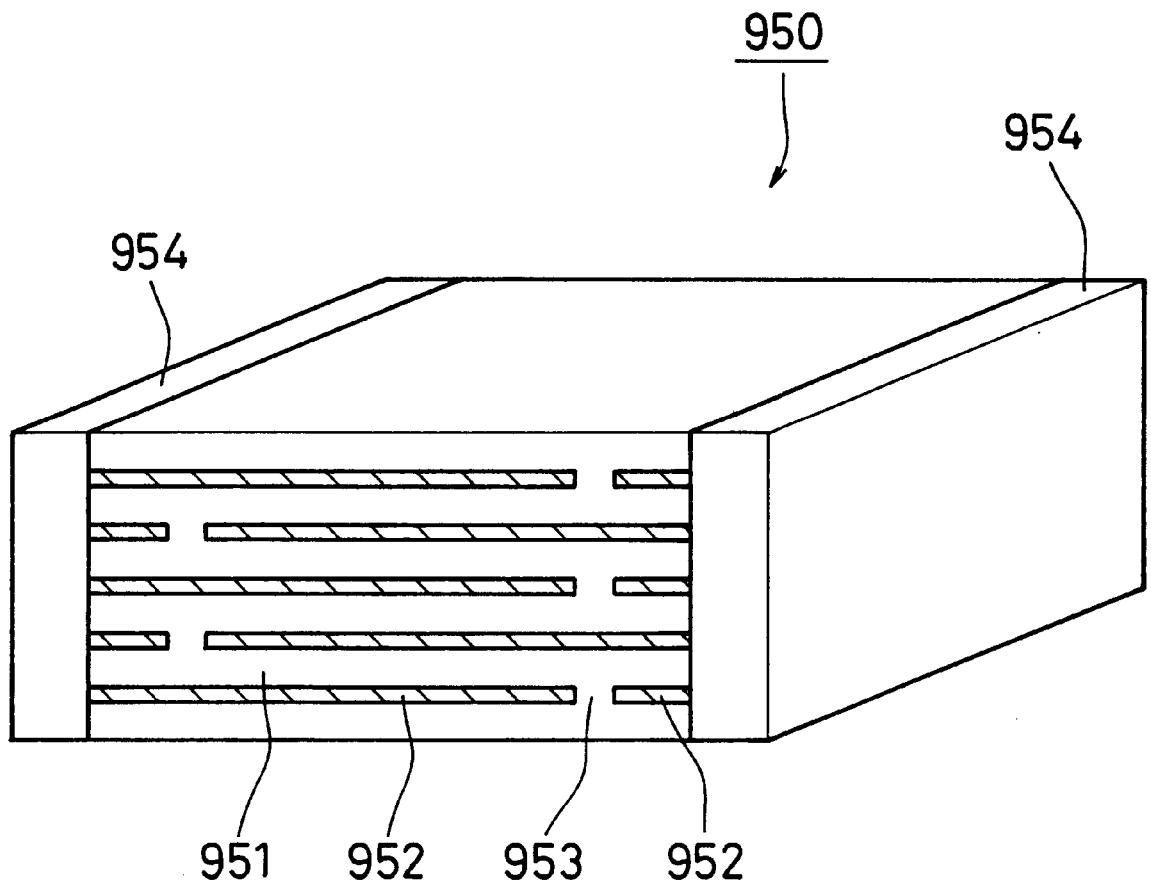
FIG. 16 is a cross-sectional drawing schematically showing a capacitor.

Furthermore, the element layer includes resin layers and metal thin film layers deposited alternately, and each resin layer serves as a dielectric, and a pair of metal thin film layers sandwiching the dielectric serve as electrodes, and thus the element layer generates capacitance as a capacitor. To allow the resin layer to serve as a dielectric layer, the pair of metal thin film layers sandwiching the dielectric layer are required to be connected in such a manner that they have different potentials. To meet this end, as shown in FIG. 16, a margin 953 is formed so that the external electrodes are insulated electrically, and the position of the margin 953 above the resin layer is displaced from that of the margin 953 below the resin layer.

The reinforcement layer includes metal thin film layers and resin layers deposited alternately, and when used in a capacitor, it does not contribute to generate capacitance of the capacitor. The reinforcement layer further prevents the element layer, which is a capacitance generation portion, from being damaged by heat or external pressure in the process of manufacturing a capacitor using the same, or in the process of mounting the capacitor on a printed circuit board. By having a metal thin film layer, the adhesion strength of the external electrodes can be increased. The adhesion strength of the external electrodes mainly is affected by the strength of the connection with the metal thin film layer, whereas the strength of the connection with the resin layer contributes only little to the adhesion strength. To prevent the reinforcement layer from functioning as a capacitance generation portion of the capacitor, unlike the above-described element layer, the margins above and below the resin layer are formed in the same position in the vertical direction (the deposition direction).

According to the present invention, an annular layered product formed on the supporting base (can roller 101) as described above is cut perpendicularly to the travel direction of the supporting base, removed from the supporting base and pressed under heat to form into a flat capacitor base element. Then, the capacitor base element is cut at a predetermined position and provided with external electrodes. Thus, a capacitor of the present invention can be obtained.

Figure 8:
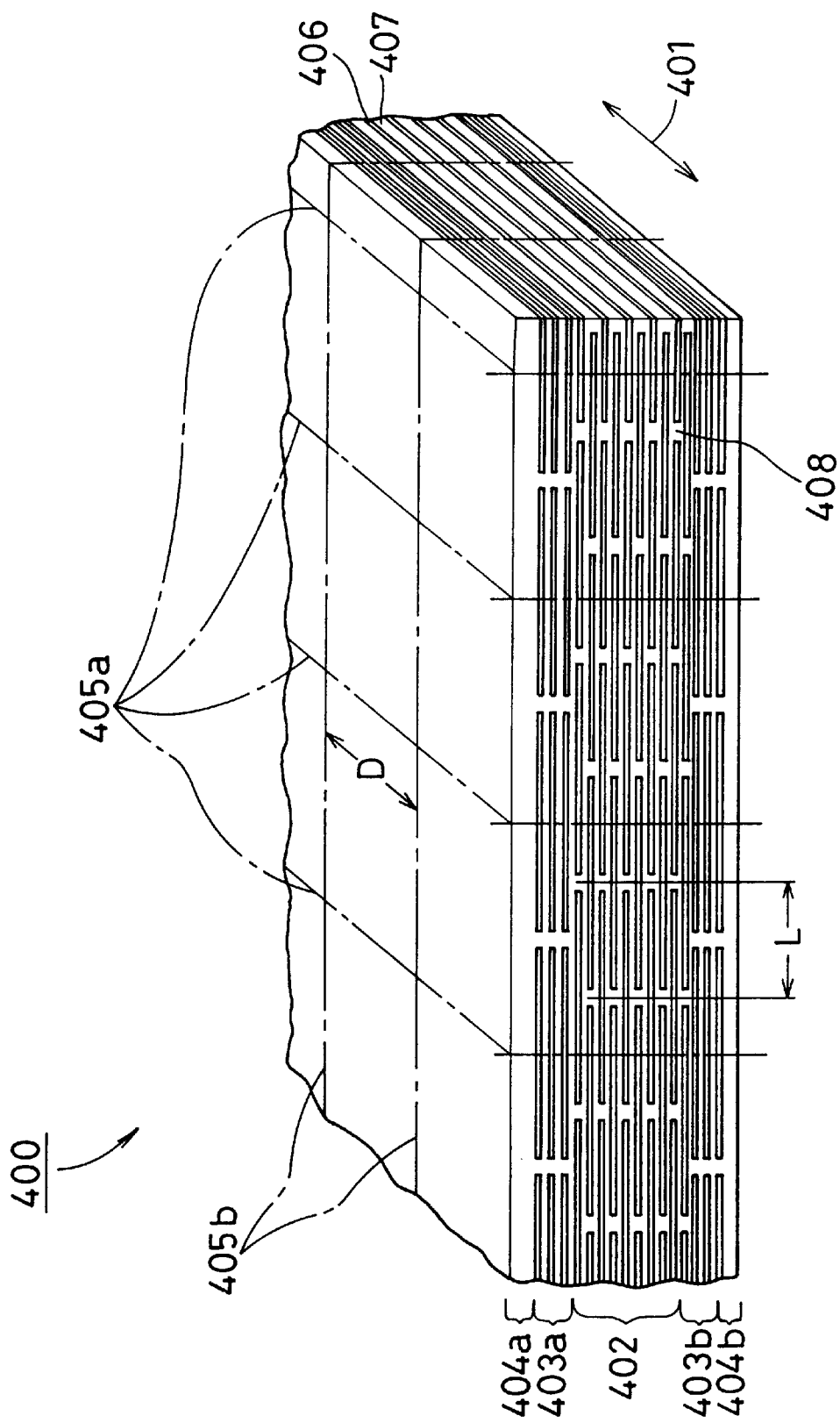
FIG. 8 is a partial perspective view illustrating a flat capacitor base element.

FIG. 8 is a perspective drawing schematically showing an example of the capacitor base element obtained in this manner. Arrow 401 in FIG. 8 shows the travel direction of the circumferential surface of the supporting base. A capacitor base element 400 shown in FIG. 8 includes a first protective layer 404*b*, a first reinforcement layer 403*b*, an element layer 402, a second reinforcement layer 403*a*, and a second protective layer 404*a* in this order from the side of the supporting base (the lower side of the FIG. 8). In FIG. 8, reference numeral 406 denotes a metal thin film layer, and reference numeral 407 denotes a resin layer, and reference numeral 408 denotes a margin. FIG. 8 is a schematic drawing of how the layers are deposited so that the number of depositions is much smaller than that in an actual capacitor base element.

This capacitor base element is cut at sectional planes 405*a* and external electrodes are formed on the sectional planes. The external electrodes can be formed, for example by spraying metal such as brass. The external electrodes may comprise a plurality of layers. For example, an underlying layer connected electrically to the metal thin film layer 406 may be formed by spraying metal, and another layer may be formed thereon by spraying metal, plating or coating or the like. More specifically, metal having good adhesion strength with the layered product can be used for the underlying layer, and for the layer thereabove, metal having good adhesiveness with metal or resin that is contacted (deposited) thereon can be selected.

Thereafter, the layered product is cut at sectional planes 405*b* in FIG. 8. Thus, a capacitor shown in FIG. 9 can be obtained.

Figure 9:
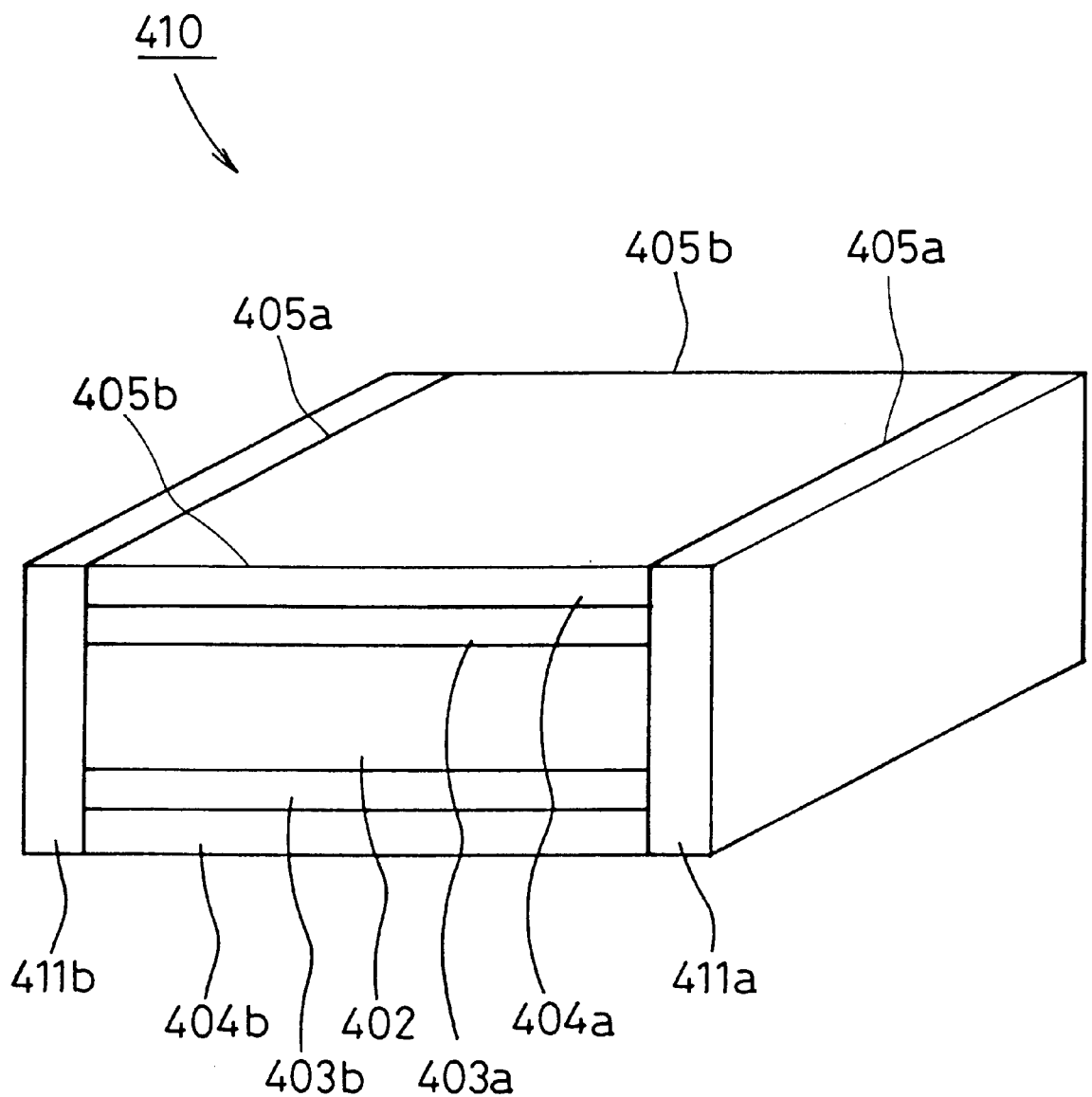
FIG. 9 is a perspective view illustrating a chip capacitor.

Referring to FIG. 9, the capacitor includes a first protective layer 404*b*, a first reinforcement layer 403*b*, an element layer 402, a second reinforcement layer 403*a*, a second protective layer 404*a*, and external electrodes 411*a* and 411*b*, which are opposed to each other and connected electrically to deposited metal thin film layers. Lines 405*a* and 405*b* correspond to the sectional planes 405*a* and 405*b* in FIG. 8, respectively.

The present invention is directed to a method for manufacturing a capacitor, as described above, comprising the step of depositing the first protective layer, the first reinforcement layer, the element layer, the second reinforcement layer, the second protective layer sequentially on the rotating supporting base, where a check point is provided in the process of the deposition for at least one layer, and based on the deposition status up to the check point, the number of depositions (the number of rotations of the supporting base) after the check point is determined.

Hereinafter, this will be described specifically.

First, the process for depositing the first protective layer will be described.

According to the present invention, during deposition for the first protective layer, the deposition thickness of each deposited resin layer is measured. A check point is provided at a predetermined point during deposition for the first protective layer, and based on the measured thickness and the number of the resin layers up to the check point and the intended thickness of the first protective layer, the number of layers to be deposited further for the first protective layer is determined.

A device 151 for measuring a resin layer shown in FIG. 1 measures the deposition thickness of the deposited resin layers. The thickness measuring device 151 measures a gap with the surface of a resin layer after each rotation of the can roller 101 and calculates the deposition thickness of a newly deposited resin layer based on the difference with the gap obtained by the previous measurement. It is preferable that the thickness measuring device 151 measures the gap without contact. For example, a device for measuring a distance that utilizes laser light can be used. A contact-type distance-measuring device is not preferable because it may damage a very thin resin layer of the present invention readily (e.g., deformation of layers, surface chapping, rupture of layers).

Figure 10:
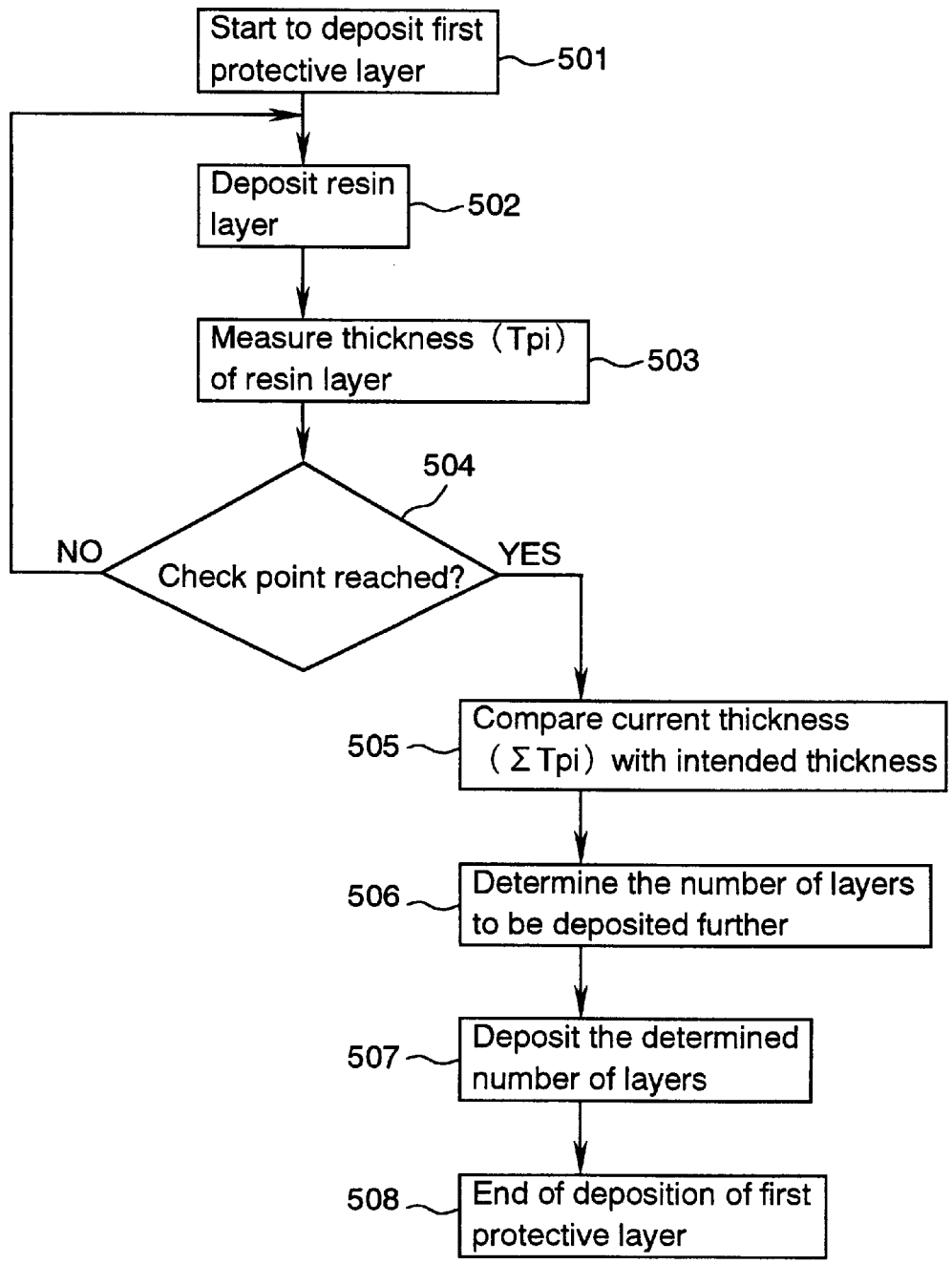
FIG. 10 is a flow chart of an example of a method for depositing a first protective layer in accordance with the present invention.

FIG. 10 is a flow chart of an example of a method for depositing the first protective layer.

When starting to deposit the first protective layer (step 501), the apparatus 250 for forming a resin layer forms a resin layer on the circumferential surface of the can roller 101 (step 502). Thereafter, the thickness measuring device 151 measures the thickness Tpi (where i is a natural number and represents the number of depositions for resin layers in the first protective layer) of the deposited resin layer (step 503). Then, it is determined whether or not the number of deposited resin layers has reached a predetermined check point (step 504). When it has not reached the check point yet, the can roller 101 continues to rotate further so that steps 502 to 504 are repeated. Since, in principle, no metal thin film layer is formed for the first protective layer, the shielding plate 112 on the apparatus 103 for forming a metal thin film is closed during the deposition of the first protection layers.

When the number of deposited resin layers has reached a predetermined check point, the total deposition thickness (ΣTpi) up to the check point is calculated and compared with the intended thickness of the first protective layer (step 505). The result of the comparison determines the number of layers to be deposited further for the first protective layer (step 506). The number of layers to be deposited further is determined, for example by dividing the difference between the intended value and the total deposition thickness (ΣTpi) at the check point by an average thickness of one resin layer up to the check point. Alternatively, if the deposition thickness of one resin layer varies over time, the number of layers to be deposited further may be determined by considering an incremental tendency of the deposition thickness of the first protective layer up to the check point and predicting a subsequent incremental tendency.

Thereafter, the determined number of layers are deposited (step 507), and the deposition for the first protective layer is completed (step 508).

In this manner, the check point is provided at a predetermined point during the deposition, and the number of layers to be deposited further is determined based on the deposition status up to the check point, whereby the total deposition thickness of the first protective layer can be an intended value with a small dispersion. In particular, even if the amount of resin layer material evaporated varies over time or suddenly so that the deposition thickness of the resin layer varies, the first protective layer with an intended thickness can be formed by measuring an actual deposition thickness and predicting subsequent variations based on a variation tendency prior to the check point. Furthermore, even if the deposition thickness of each resin layer cannot be obtained as desired, the number of layers can be changed suitably, based on the actual deposition thickness. Therefore, the following secondary effect can be provided: the control of the deposition thickness (e.g., the control of the amount of resin layer material evaporated) can be simplified. Moreover, since the first protective layer can be formed as intended without a dispersion, an expected effect of the first protective layer such as the protection for the element layer can be provided sufficiently. Therefore, a capacitor with good and stable quality can be manufactured.

Next, the process for depositing the first reinforcement layer will be described.

According to the present invention, during deposition for the first reinforcement layer, the deposition thickness of each deposited metal thin film layer and the deposition thickness of each deposited resin layer in the first reinforcement layer are measured. A check point is provided at a predetermined point during deposition for the first reinforcement layer, and based on the measured thicknesses of the metal thin film layers and the resin layers and the number of layers in the first reinforcement layer up to the check point and the intended thickness of the first reinforcement layer, the number of layers to be deposited further for the first reinforcement layer is determined.

The device 151 for measuring a resin layer used to deposit the first protective layer can be used to measure the deposition thickness of the deposited resin layers here as well. However, since, in the first reinforcement layer, the metal thin film layers also are formed, it is necessary to subtract the thickness thereof. More specifically, in FIG. 1, a metal thin film layer is assumed to be deposited at a point A (not shown) on the can roller 101. Then, the thickness measuring device 152 measures the thickness at the point A, which value is indicated as B1. Next, after a resin layer is deposited at the point A, the thickness measuring device 151 measures the thickness at the point A, which value is indicated as B2. The difference between B1 and B2 is the thickness of one resin layer deposited therebetween. The measuring timing of the thickness measuring devices 151 and 152 can be synchronized simply by using a rotary encoder or the like. The thickness of the deposited metal thin film layer is measured by the device 152 for measuring a metal thin film layer thickness shown in FIG. 1. The thickness measuring device 152 measures a gap with the surface of the metal thin film layer for each rotation of the can roller 101 and calculates the deposition thickness of the newly deposited metal thin film layer based on the difference with the gap obtained by the previous measurement, as the thickness measuring device 151. However, it is necessary to subtract the deposition thickness of the resin layer. It is preferable that the thickness measuring device 152 measures the gap without contact. For example, a device for measuring a distance that utilizes laser light can be used. A contact-type distance-measuring device is not preferable because it may damage a very thin metal thin film layer of the present invention readily. In the above example, the thicknesses of the resin layer and the metal thin film layer are measured by synchronizing the can roller. However, the measuring method is not limited thereto. For example, comparing measurement values for each rotation of the can roller provides the thickness of a deposited layer having one resin layer and one metal thin film layer, and comparing measurement values for each n (n is a natural number) times of rotation of the can roller provides the thickness of a deposited layer consisting of n resin layers and n metal thin film layers.

Figure 11:
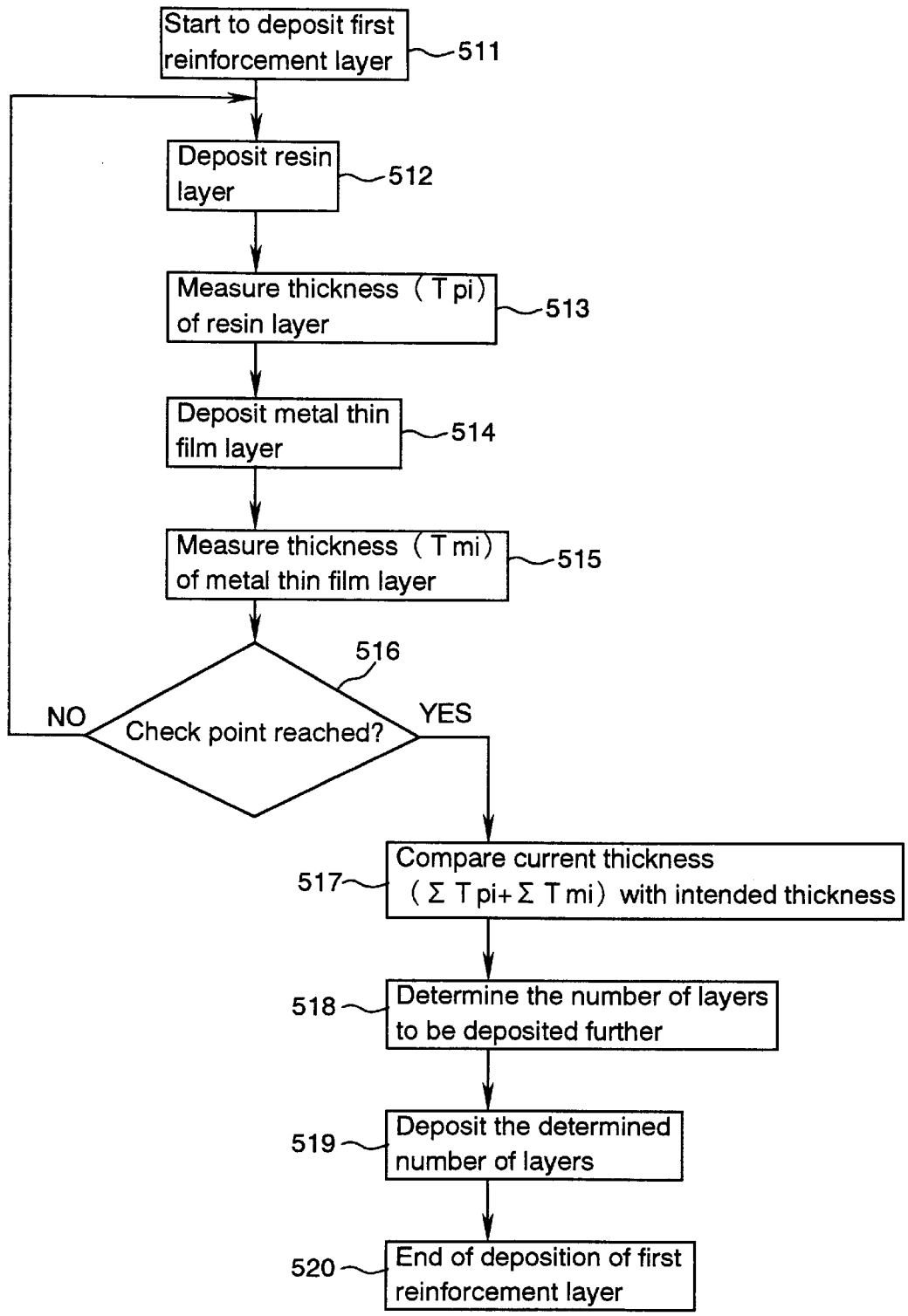
FIG. 11 is a flow chart of an example of a method for depositing a first reinforcement layer in accordance with the present invention.

FIG. 11 is a flow chart of an example of a method for depositing the first reinforcement layer.

The deposition for the first reinforcement layer shown in FIG. 11 is the same as the deposition for the first protective layer shown in FIG. 10 except that the deposition shown in FIG. 11 further includes the deposition process for the metal thin film layers.

More specifically, when starting to deposit the first reinforcement layer (step 511), the apparatus 250 for forming a resin layer forms a resin layer on the first protective layer as described above (step 512). Thereafter, the thickness measuring device 151 measures the thickness Tpi (where i is a natural number and represents the number of depositions for resin layers in the first reinforcement layer) of the deposited resin layer (step 513). Then, the apparatus 103 for forming a metal thin film forms a metal thin film layer on the resin layer formed as above (step 514). Thereafter, the thickness measuring device 152 measures the thickness Tmi (where i is a natural number and represents the number of depositions for metal thin film layers in the first reinforcement layer) of the deposited metal thin film layer (step 515). Then, it is determined whether or not the number of depositions has reached a predetermined check point (step 516). When it has not reached the check point yet, the can roller 101 continues to rotate further so that steps 512 to 516 are repeated.

When the number of depositions has reached a predetermined check point, the total deposition thickness ($\Sigma$Tpi+$\Sigma$Tmi) up to the check point is calculated and compared with the intended thickness of the first reinforcement layer (step 517). The result of the comparison determines the number of layers to be deposited further for the first reinforcement layer (i.e., the number of rotation of the can roller 101) (step 518). The number of layers to be deposited further is determined, for example by dividing the difference between the intended value and the total deposition thickness ($\Sigma$Tpi+$\Sigma$Tmi) at the check point by the sum of an average thickness of one resin layer and an average thickness of one metal thin film layer up to the check point. Alternatively, if the deposition thickness of one resin layer or metal thin film layer varies over time, the number of layers to be deposited further may be determined by considering an incremental tendency of the deposition thickness of the first reinforcement layer up to the check point and predicting a subsequent incremental tendency.

Thereafter, the determined number of layers are deposited (step 519), and the deposition for the first reinforcement layer is completed (step 520).

In this manner, the check point is provided at a predetermined point during the deposition, and the number of layers to be deposited further is determined based on the deposition status up to the check point, whereby the total deposition thickness of the first reinforcement layer can be an intended value with a small dispersion. In particular, even if the amount of resin layer material evaporated or metal thin film layer material evaporated varies over time or suddenly so that the deposition thickness of the resin layer or the metal thin film layer varies, the first reinforcement layer with an intended thickness can be formed by measuring an actual deposition thickness and predicting subsequent variations based on a variation tendency prior to the check point. Furthermore, even if the deposition thickness of each resin layer or each metal thin film cannot be obtained as desired, the number of layers can be changed suitably, based on the actual deposition thickness. Therefore, the following secondary effect can be provided: the control of the deposition thickness (e.g., the control of the amount of the resin layer material or metal thin film layer material evaporated) can be simplified. Moreover, since the first reinforcement layer can be formed as intended without a dispersion, expected effects of the first reinforcement layer such as the protection for the element layer or an improvement in the adhesion strength with the external electrodes can be provided sufficiently. Therefore, a capacitor with good and stable quality can be manufactured.

Next, the process for depositing the element layer will be described.

According to the present invention, during deposition for the element layer, the deposition thickness of each deposited metal thin film layer and the deposition thickness of each deposited resin layer in the element layer are measured. A check point is provided at a predetermined point during deposition for the element layer, and based on the measured thickness and the number of the resin layers in the element layer up to the check point and the intended capacitance as a capacitor, the number of layers to be deposited further for the element layer is determined.

The thickness measuring devices 151 and 152 used for the deposition for the first reinforcement layer can be used to measure the deposition thickness of the deposited resin layers and metal thin film layers here as well.

Figure 12:
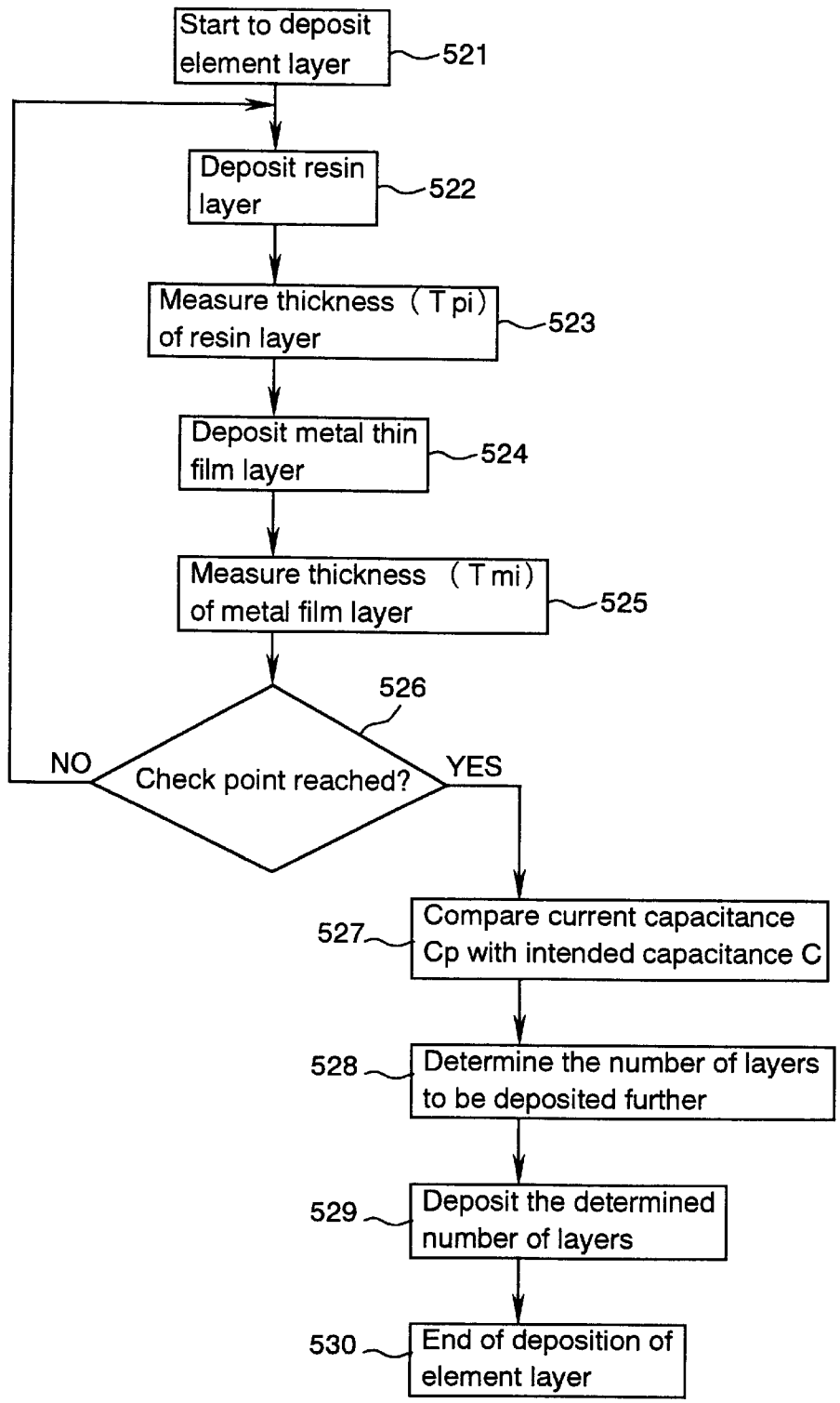
FIG. 12 is a flow chart of an example of a method for depositing an element layer in accordance with the present invention.

FIG. 12 is a flow chart of an example of a method for depositing the element layer.

When starting to deposit the element layer (step 521), the apparatus 250 for forming a resin layer forms a resin layer on the first protective layer as described above (the first reinforcement layer, if formed) (step 522). Thereafter, the thickness measuring device 151 measures the thickness Tpi (where i is a natural number and represents the number of depositions for resin layers in the element layer) of the deposited resin layer (step 523). Then, the apparatus 103 for forming a metal thin film forms a metal thin film layer on the resin layer formed as above (step 524). Thereafter, the thickness measuring device 152 measures the thickness Tmi (where i is a natural number and represents the number of depositions for metal thin film layers in the element layer) of the deposited metal thin film layer (step 525). Then, it is determined whether or not the number of depositions has reached a predetermined check point (step 526). When it has not reached the check point yet, the can roller 101 continues to rotate further so that steps 522 to 526 are repeated.

When the number of depositions has reached a predetermined check point, an electrostatic capacitance Cp of a capacitor that is assumed to be manufactured from the element layer formed up to the check point is calculated and compared with the intended electrostatic capacitance C (step 527).

The electrostatic capacitance Cp is calculated as follows:

$$Cp = k\Sigma(S/Tpi), \qquad (1)$$

where k is a dielectric constant of the resin layer, which is a property value particular to a resin layer material, and S is an area of a region that functions as a dielectric in the resin layer in the element layer, which can be calculated, for example, based on the intervals of each of the sectional planes 405a and 405b and the width W of the margins 408 (see FIG. 8). More specifically, as shown in FIG. 8, when the pitch of the sectional plane 405b is indicated as D, and the pitch between the central portions of the margins 408 is indicated as L, the S can be calculated as $S=D\times(L-W)$. Tpi is the thickness of the resin layer deposited in the $i^{th}$ deposition for the element layer and obtained by the device 151 for measuring a resin layer.

The result of the comparison at step 527 determines the number of layers to be deposited further for the element layer (i.e., the number of rotation of the can roller 101) (step 528). The number of layers to be deposited further for the element layer is determined, for example by dividing the difference between the intended capacitance C and the capacitance Cp at the check point by an average capacitance for one resin layer up to the check point. Alternatively, if the deposition thickness of one resin layer varies over time so that the average capacitance for one resin layer varies, the number of layers to be deposited further may be determined by considering an incremental tendency of the capacitance Cp up to the check point and predicting a subsequent incremental tendency.

Thereafter, the determined number of layers are deposited (step 529), and the deposition for the element layer is completed (step 530).

In the above-described process, step 525 where the thickness Tmi of the metal thin film layer is measured can be omitted. However, to measure the thickness Tpi of the resin layer accurately or to adopt a method where the second protective layer is deposited, as described later, the measurement value of the thickness of the metal thin film layer in the element layer is required. Therefore, it is preferable to measure the thickness Tmi of the metal thin film layer.

In this manner, the check point is provided at a predetermined point during the deposition, and the number of layers to be deposited further is determined based on the electrostatic capacitance up to the check point, thereby obtaining a capacitor having a capacitance as intended with a small dispersion. In particular, even if the amount of resin layer material evaporated varies over time or suddenly so that the deposition thickness of the resin layer varies, a capacitor having a capacitance as intended can be obtained easily by measuring an actual deposition thickness and predicting subsequent variations based on a variation tendency prior to the check point. Furthermore, even if the deposition thickness of the resin layer cannot be obtained as desired, the number of layers can be changed suitably, based on the actual deposition thickness. Therefore, the following secondary effect can be provided: the control of the deposition thickness (e.g., the control of the amount of the resin layer material evaporated) can be simplified.

The above-described method is effective for the variation in the deposition thickness of the resin layers. On the other hand, the following method can be used to cope with the variations in the margin width.

In the present invention, during the deposition for the element layer, the width of each margin is measured, and a check point is provided at a predetermined point during the deposition for the element layer. An area where metal thin film layers are opposed to each other (hereinafter, referred to as "opposing area of metal thin film layers") is calculated from the measured margin width. Based on the opposing areas of the metal thin film layers and the number of the deposited resin layers up to the check point and the intended capacitance of the capacitor, the number of layers to be deposited further for the element layer is determined.

The width of the margins can be measured as follows: For example, in the stage after the formation of the resin layer and before the formation of the metal thin film layer, a camera 153 (see FIG. 1) takes an image of the vicinity of the margin so that the difference in color of reflected light between the metal thin film layer portion and the margin is recognized through the image. Thus, the width of the margin can be measured. Alternatively, the width of the margin can be measured after the formation of the metal thin film layer and before the formation of the resin layer in the following manner: the position where the cameral 153 is installed is changed, and the camera 153 takes an image of the vicinity of the margin so that the difference in brightness of reflected light between the metal thin film layer portion and the margin is recognized through the image. Thus, the width of the margin can be measured.

Figure 13:
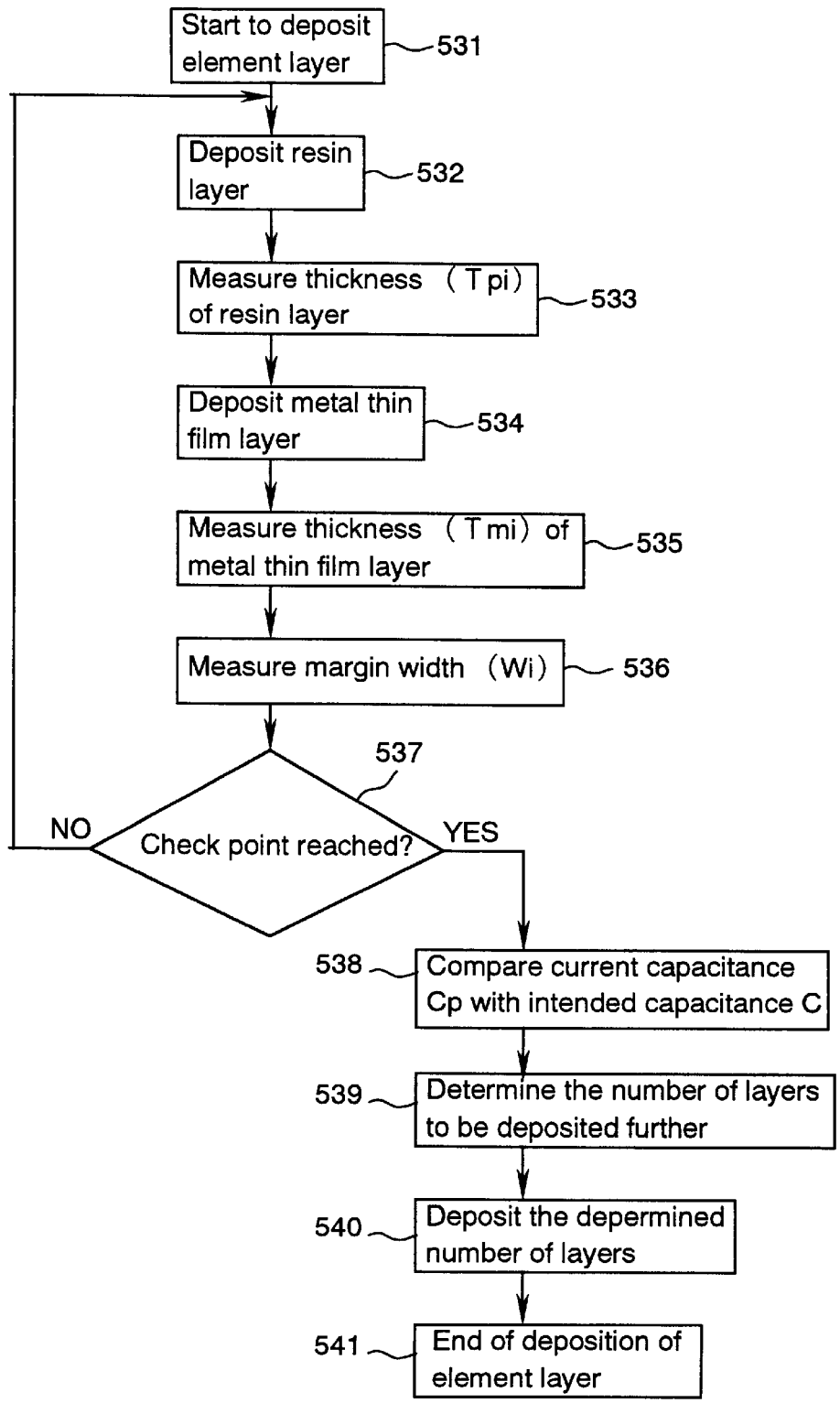
FIG. 13 is a flow chart of another example of a method for depositing an element layer in accordance with the present invention.

FIG. 13 is a flow chart of an example of a method for depositing the element layer.

When starting to deposit the element layer (step 531), the apparatus 250 for forming a resin layer forms a resin layer on the first protective layer as described above (the first reinforcement layer, if formed) (step 532). Thereafter, the thickness measuring device 151 measures the thickness Tpi (where i is a natural number and represents the number of depositions for resin layers in the element layer) of the deposited resin layer (step 533). Then, the apparatus 103 for forming a metal thin film forms a metal thin film layer on the resin layer formed as above (step 534). Thereafter, the thickness measuring device 152 measures the thickness Tmi (where i is a natural number and represents the number of depositions for metal thin film layers in the element layer) of the deposited metal thin film layer (step 535). Then, the width Wi (where i is a natural number and represents the measurement number of the metal thin film layers in the element layer) of the margin is measured (step 536). Then, it is determined whether or not the number of depositions has reached a predetermined check point (step 537). When it has not reached the check point yet, the can roller 101 continues to rotate further so that steps 532 to 537 are repeated.

When the number of depositions has reached a predetermined check point, an electrostatic capacitance Cp of a capacitor that is assumed to be manufactured from the element layer formed up to the check point is calculated and compared with the intended electrostatic capacitance C (step 538).

The electrostatic capacitance Cp is calculated as follows:

$$Cp = k\Sigma(Si/Tp), \quad (2)$$

where k is a dielectric constant of the resin layer, which is a property value particular to a resin layer material, and Si is an area of a region that functions as a dielectric in the resin layer in the element layer, which can be calculated, for example, based on the intervals of each of the sectional planes 405a and 405b (see FIG. 8) and the width Wi of the margin obtained at step 536. Tp is the thickness of the resin layer in the element layer.

The result of the comparison at step 538 determines the number of layers to be deposited further for the element layer (i.e., the number of rotations of the can roller 101) (step 539). The number of layers to be deposited further for the element layer is determined, for example by dividing the difference between the intended capacitance C and the capacitance Cp at the check point by an average capacitance of one resin layer up to the check point. Alternatively, if the width of the margin varies over time so that the average capacitance for one resin layer varies, the number of layers to be deposited further may be determined by considering an incremental tendency of the capacitance Cp up to the check point and predicting a subsequent incremental tendency.

Thereafter, the determined number of layers are deposited (step 540), and the deposition for the element layer is completed (step 541).

In the above-described process, steps 533 and 535 where the thickness of the resin layer and the thickness of the metal thin film are measured, respectively, can be omitted.

However, in the process for depositing the second protective layer as described later, the measurement values of the thickness of the resin layer and the thickness of the metal thin film layer in the element layer are required. Therefore, it is preferable to measure them.

In this manner, the check point is provided at a predetermined point during the deposition, and the number of layers to be deposited further is determined based on the electrostatic capacitance up to the check point, thereby obtaining a capacitor having a capacitance as intended with a small dispersion. In particular, even if the amount or the width of pattering material deposited for forming the margin varies over time or suddenly so that the width of the margin varies, a capacitor having a capacitance as intended can be easily obtained by measuring an actual margin width and predicting subsequent variations based on a variation tendency prior to the check point. Furthermore, even if the width of the margin cannot be obtained as desired, the number of layers can be changed suitably, based on the actual margin width. Therefore, the following secondary effect can be provided: the control of the deposition status of the patterning material (e.g., the control of the amount of the patterning material evaporated or the distance Dw between the apparatus for applying patterning material and the surface on which the patterning material is deposited) can be simplified.

Furthermore, to take variations in both of the thickness of the resin layer deposited and the width of the margin into consideration, the electrostatic capacitance Cp at step 538 in the flow chart of FIG. 13 can be calculated as follows:

$$Cp=k\Sigma(Si/Tpi) \tag{3}$$

More specifically, the electrostatic capacitance Cp at the check point is calculated more exactly, based on the thickness Tpi of the resin layer deposited in the $i^{th}$ deposition for the element layer measured at step 533 and the area Si calculated based on the width Wi of the margin of the metal thin film layer deposited in the $i^{th}$ deposition measured at step 536.

In this manner, the electrostatic capacitance of the obtained capacitor can be even closer to the intended value and the dispersion can be even smaller.

Next, the process for depositing the second reinforcement layer will be described.

According to the present invention, during deposition for the second reinforcement layer, the deposition thickness of each deposited metal thin film layer and the deposition thickness of each deposited resin layer in the second reinforcement layer are measured. A check point is provided at a predetermined point during the deposition for the second reinforcement layer, and based on the measured thicknesses and the number of the metal thin film layers and the resin layers for the second reinforcement layer up to the check point and the intended thickness of the second reinforcement layer, the number of layers to be deposited further for the second reinforcement layer is determined.

The deposition process for the second reinforcement layer of the present invention can be performed in the same manner as the deposition process for the first reinforcement layer (FIG. 11) as described above, and the obtained effect is the same as that of the deposition for first reinforcement layer, so that the detailed description will be omitted here.

Next, the process for depositing the second protective layer will be described.

According to the present invention, during the deposition, the deposition thickness of each deposited metal thin film layer and the deposition thickness of each deposited resin layer are measured. A check point is provided at a predetermined point during the deposition for the second protective layer, and based on the measured thicknesses and the number of the metal thin film layers and the resin layers up to the check point and the intended thickness of the capacitor, the number of layers to be deposited further for the second protective layer is determined.

Figure 14:
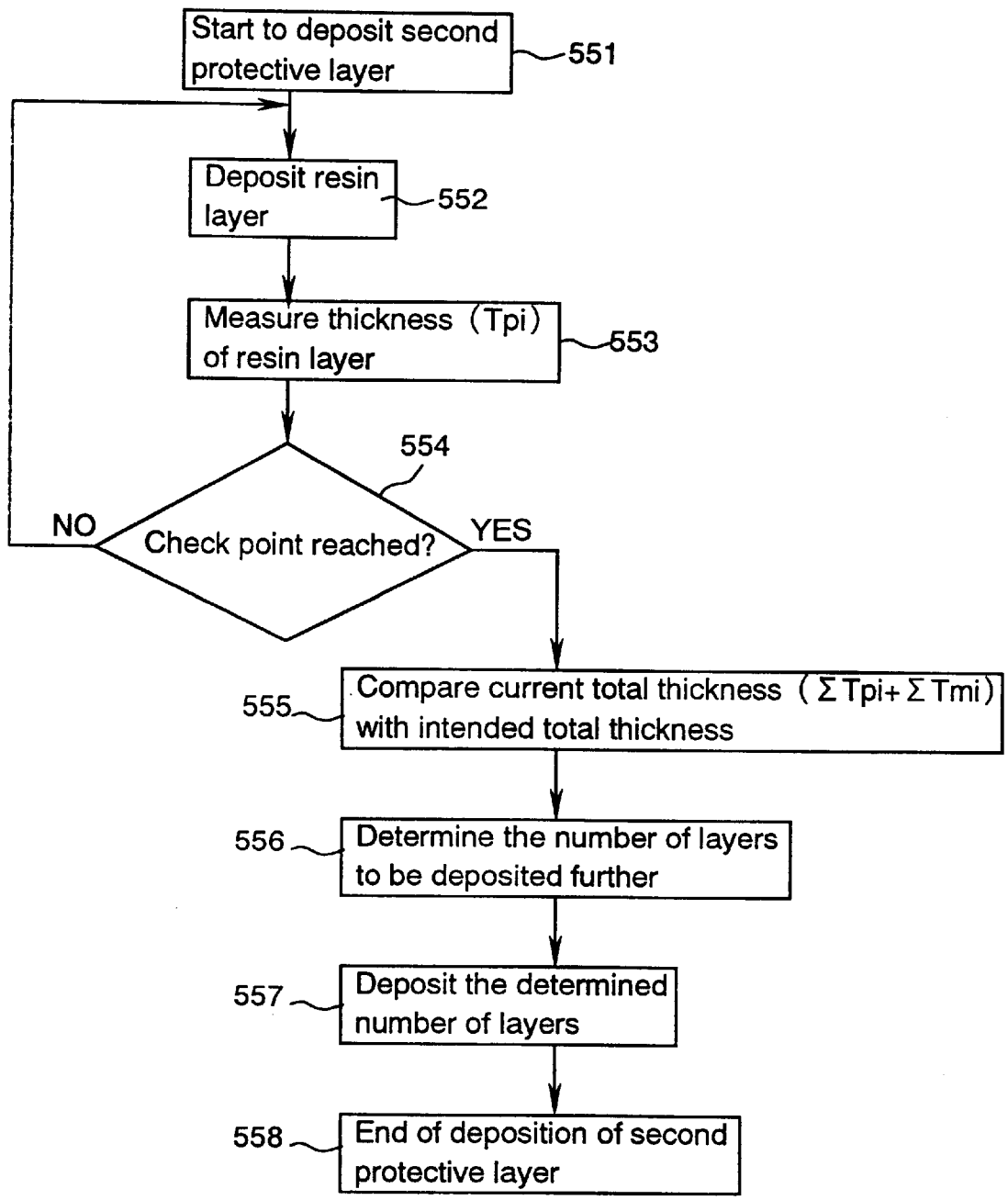
FIG. 14 is a flow chart of an example of a method for depositing a second protective layer in accordance with the present invention.
Figure 15:
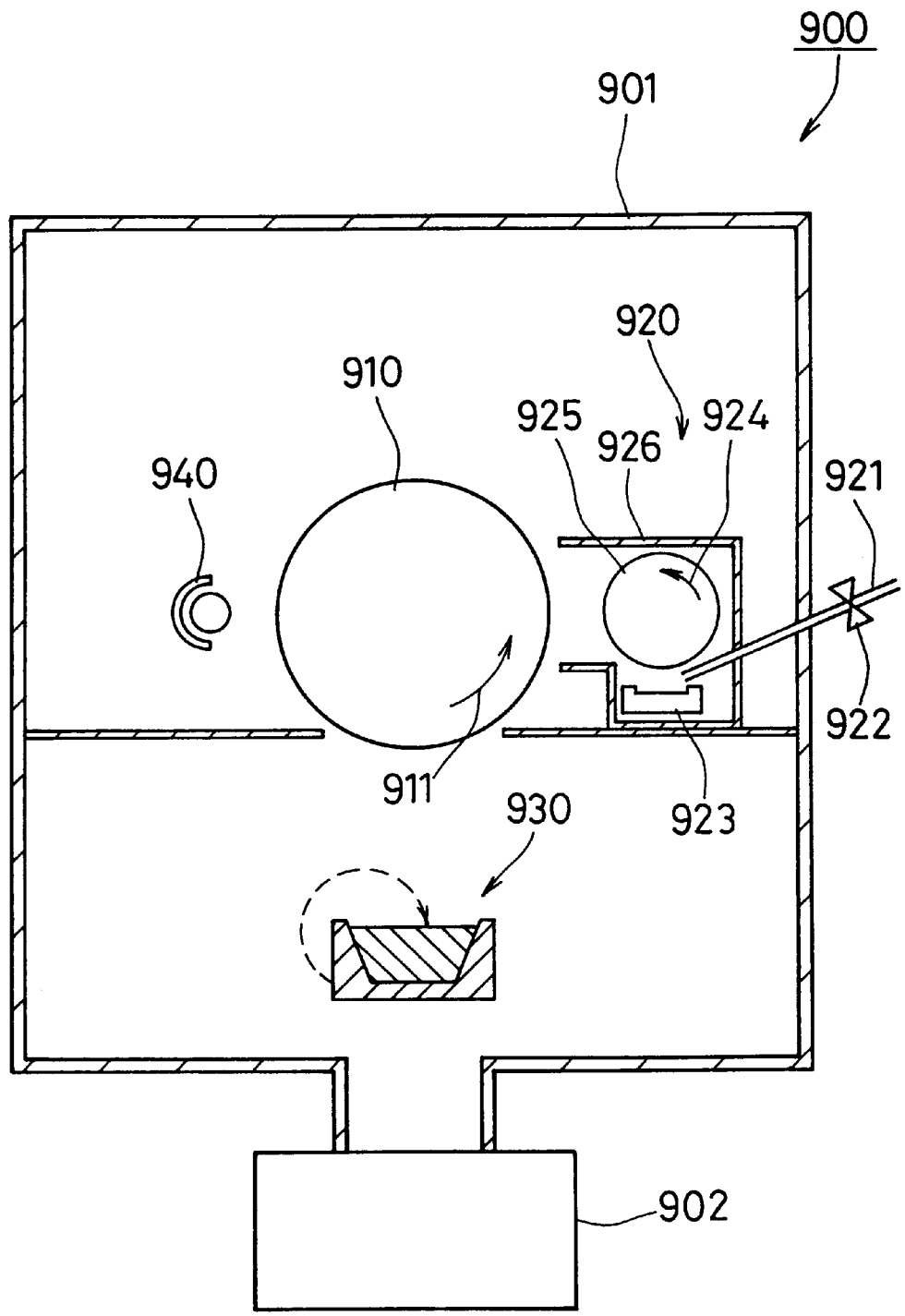
FIG. 15 is a cross-sectional drawing schematically showing an example of a manufacturing apparatus for performing a conventional method for manufacturing a capacitor.

FIG. 14 is a flow chart of an example of a method for depositing the second protective layer.

The processes from starting to deposit the second protective layer (step 551) to reaching a predetermined check point (step 554) are the same as steps 501 to 504 that have been described with reference to FIG. 10 for the deposition for the first protective layer, so that the detailed description will be omitted here.

When a predetermined check point is reached, the total thickness ($\Sigma Tpi+\Sigma Tmi$) of the deposition up to the check point is calculated and compared with the intended total thickness of the capacitor (step 555). Herein, the total thickness ($\Sigma Tpi+\Sigma Tmi$) of the deposition refers to the sum total of all the resin layers and all the metal thin film layers after the start of the deposition on the can roller. Then, the number of further depositions to be needed to achieve the intended total thickness is determined (step 556). The number of depositions to be performed further can be determined, for example by dividing the difference between the intended thickness and the total thickness ($\Sigma Tpi+\Sigma Tmi$) of the deposition at the check point by an average thickness of one resin layer up to the check point. Alternatively, if the deposition thickness of one resin layer varies over time, the number of layers to be deposited further may be determined by considering an incremental tendency of the deposition thickness of the second protective layer up to the check point and predicting a subsequent incremental tendency.

Thereafter, the determined number of layers are deposited (step 557), and the deposition for the second protective layer is completed (step 558).

In this manner, the check point is provided at a predetermined point during the deposition for the second protective layer, and the number of layers to be deposited further is determined based on the deposition status up to the check point, whereby the total deposition thickness of the finally obtained capacitor can be an intended value with a small dispersion. In particular, even if the amount of resin layer material evaporated or metal thin film layer material evaporated varies over time or suddenly in the process of the deposition so that the deposition thickness of the resin layer or the metal thin film layer varies, a capacitor with an intended thickness can be obtained by measuring an actual deposition thickness and predicting subsequent variations based on a variation tendency prior to the check point. Furthermore, even if the deposition thickness of each resin layer or each metal thin film layer cannot be obtained as desired, the number of layers can be changed suitably, based on the actual deposition thickness. Therefore, the following secondary effect can be provided: the control of the deposition thickness (e.g., the control of the amount of resin layer material or metal thin film layer material evaporated) can be simplified.

However, according to the above-described method for depositing the second protective layer, the following problem may arise in some deposition statuses up to the check point. When the number of layers to be deposited further for the second protective layer is determined so that the intended total deposition thickness is achieved (step 556), the number of layers for the second protective layer may be too small, so that effects expected from the second protective layer cannot be displayed. For example, the protective function for the element layer cannot be displayed sufficiently, resulting in a capacitor with poor quality. For example, the number of layers to be deposited further for the element layer is adjusted to obtain a desired capacitance. When the thickness of the resin layers in the element layer becomes larger than intended during the formation, the obtained capacitance becomes smaller. Therefore, it is necessary to increase the number of deposited layers for the element layer. As a result, the thickness of the element layer becomes larger than a planned value. Consequently, the number of layers in the second protective layer is required to be reduced in order to allow the total thickness of the capacitor to be within a planned value range. In order to prevent this from occurring, the following is possible.

At the point when the deposition for the second reinforcement layer (or the element layer, when the second reinforcement layer is not deposited) is completed, the total deposition thickness is calculated so as to obtain the difference with the intended total thickness. The obtained difference is compared with an acceptable minimum thickness necessary for the second protective layer to display desired functions. As a result of the comparison, when the difference is smaller than the acceptable minimum thickness of the second protective layer, the deposition is stopped at this point. On the other hand, when the difference is equal to or larger than the acceptable minimum thickness of the second protective layer, the deposition for the second protective layer is started. This allows the production of capacitors with defects to be stopped at an early stage so that wasteful production can be prevented.

When the second reinforcement layer is deposited, the above-described determination can be performed, not upon completion of the deposition for the second reinforcement layer, but upon completion of the deposition for the element layer. In this case, based on the difference between the total deposition thickness and the intended total thickness at this point, the intended thickness of the second reinforcement layer that will be deposited thereafter can be changed in an acceptable range. For example, when the difference between the total deposition thickness and the intended total thickness at the point of the completion of the deposition for the element layer is smaller than the sum of the original intended thickness of the second reinforcement layer and the acceptable minimum thickness of the second protective layer, if the deposition proceeds without any change, the thickness of the second protective layer is not sufficient, thus resulting in a defect. Therefore, at this point, changing the intended thickness of the second reinforcement layer to be smaller in an acceptable range may allow the second protective layer to be deposited in a thickness equal to or more than the acceptable minimum range. Thus, the production yield can improve further.

In the deposition of layers for the first protective layer, the first reinforcement layer, the element layer, the second reinforcement layer and the second protective layer as described above, only one check point is provided during the deposition for each layer. However, the present invention is not limited thereto, and two or more check points can be provided. A plurality of check points make it possible to cope with variations in the deposition thickness or the margin width that occurred after the previous check point. Therefore, even if the deposition thickness or the margin width varies irregularly and frequently, a capacitor with intended electrostatic capacitance and deposition thickness can be obtained. In particular, when a check point is provided for each rotation of the can roller and the deposition process is completed at the point when the intended value of each layer is reached, the electrostatic capacitance and the thickness can be controlled more precisely.

Furthermore, the above-described deposition method of the present invention is not necessarily performed in all the deposition processes for the first protective layer, the first reinforcement layer, the element layer, the second reinforcement layer and the second protective layer, but performed optionally. For example, when the control of the electrostatic capacitance of the capacitor is particularly important, it is sufficient to perform only the deposition method for the element layer of the present invention (FIGS. 12 and 13). When the control of the entire thickness of the capacitor is particularly important, it is sufficient to perform only the deposition method for the second protective layer of the present invention (FIG. 14).

In the above description, the check point is based on the point when the number of rotation of the supporting base has reached a predetermined rotation number from the start of deposition. However, in place of the rotation number of the supporting base, the point when the deposition thickness or the electrostatic capacitance has been reached can be used as the basis.

It is not necessary to measure the deposition thickness per one layer of the resin layers and the metal thin film layers for each rotation of the can roller. For example, after the deposition starts, the deposition thickness per layer can be calculated based on an increment of the total deposition thickness and the rotation number of the can roller when a predetermined point (e.g., a check point) is reached.

As described above, the present invention is a method for manufacturing a capacitor from a layered product obtained by depositing a resin layer and a metal thin film layer on a rotating supporting base sequentially. In this method, a check point is provided at a predetermined point, and the number of depositions to be performed further is changed suitably in accordance with the deposition status up to the check point. Thus, the electrostatic capacitance and the deposition thickness are intended values with a small dispersion, so that a capacitor with stable quality can be manufactured.

In particular, even if the amount of resin layer material, evaporation metal or patterning material evaporated varies over time or suddenly so that the deposition thickness of the resin layer or the metal thin film layer, or the margin width varies, a capacitor with intended electrostatic capacitance and deposition thickness can be obtained by measuring actual deposition thickness and margin width and predicting subsequent variations based on a variation tendency prior to the check point.

Furthermore, even if the deposition thickness of each resin layer or each metal thin film or margin width cannot be obtained as desired, the number of layers can be changed suitably, based on the actual deposition thickness or martin width. Therefore, the control of the deposition thickness or the margin width (e.g., the control of the amount of the resin layer material or evaporation metal evaporated and the amount or width of the patterning material deposited) can be simplified.

Thus, the present invention is especially effective in the industrial production of capacitors.

EXAMPLES

Hereinafter, the configuration and the effects of the present invention will be described by way of examples more specifically.

Example 1

A capacitor as shown in FIG. 9 was manufactured using an apparatus as shown in FIG. 1. Contactless-type distance-measuring devices that utilize reflection light of laser light were used for a device 151 for measuring a thickness of a resin layer and a device 152 for measuring a thickness of a metal thin film layer.

A chip capacitor having a capacitance of 0.47 µF, an outer size of about 1.5 mm thick in the deposition direction and about 1.6 mm deep and about 3.2 mm wide (in the direction of opposing external electrodes) was intended to be manufactured. The deposition structure includes a first protective layer, a first reinforcement layer, an element layer, a second reinforcement layer and a second protective layer. The intended thicknesses of the layer portions were 15 µm for the first protective layer, 340 µm for the first reinforcement layer, 340 µm for the second reinforcement layer and 15 µm for the second protective layer.

As the check point of the present invention, one check point was provided in the deposition process for each layer. More specifically, the check point in the first protective layer is a point when 15 depositions (rotations) have been performed after the start of the deposition for the first protective layer. The check point in the first reinforcement layer is a point when 700 depositions (rotations) have been performed after the start of the deposition of the first reinforcement layer. The check point in the element layer is a point when 1800 depositions (rotations) have been performed after the start of the deposition for the element layer. The check point in the second reinforcement layer is a point when 700 depositions (rotations) have been performed after the start of the deposition for the second reinforcement layer. The check point in the second protective layer is a point when 15 depositions (rotations) have been performed after the start of the deposition for the second protective layer.

The vacuum inside the vacuum container 104 was about $2 \times 10^{-4}$ Torr, and the circumferential surface of the can roller 101 was maintained at 5° C.

First, the first protective layer having only resin layers was deposited on the circumferential surface of the can roller 101 (step 501 in FIG. 10). Dicyclopentadiene dimethanoldiacrylate was used as the resin layer material and evaporated so as to be deposited on the circumferential surface of the can roller 101 by an apparatus 250 for forming a resin layer as shown in FIG. 2 (step 502). Then, for an apparatus 106 for curing resin, a UV curing device was used, which polymerized and cured the deposited protective layer material. The thickness of the thus formed resin layers was about 0.6 µm on average (step 503). The can roller 101 performed 15 rotations so that the check point was reached (step 504). At this point, the total deposition thickness was about 9 µm, and when compared with the intended thickness of 15 µm, further deposition of 6 µm was required (step 505). Since the average thickness of the resin layer was 0.6 µm, the number of layers to be deposited further was determined as 10 (step 506), and the can roller 101 performed 10 further rotations so that the deposition for the first protective layer was completed (steps 507 and 508).

Then, to form the first reinforcement layer, resin layers and metal thin film layers were deposited alternately (step 511 in FIG. 11). For the resin layer material, the same material as that for the first protective layer was used and evaporated so as to be deposited on the protective layer by the apparatus 250 for forming a resin layer (step 512). Then, for the apparatus 106 for curing resin, a UV curing device was used, which polymerized and cured the deposited resin layer material to a curing degree of 70%. The thickness of the thus formed resin layer was about 0.6 µm on average (step 513). Thereafter, the surface of the layer was treated with an oxygen plasma using an apparatus 107 for treating a resin layer surface. Then, a patterning material was applied by an apparatus 300 for applying patterning material as shown in FIGS. 3 to 5. For the patterning material, fluorine oil was used. The vapor pressure of this patterning material becomes 0.1 Torr at a temperature of 100° C. The average molecular weight of the oil is 1500. According to the method shown in FIG. 5, the patterning material was pre-evaporated by an evaporation apparatus 312 and then supplied to the apparatus 300 for applying patterning material that maintains a temperature of 170° C. For the apparatus for applying patterning material, an apparatus as shown in FIGS. 3 and 4 was used to eject vapor patterning material from circular pinholes with a diameter of 50 µm and a depth of 300 µm so that the patterning material was deposited in the form of a strip with a width of 150 µm. The patterning material is applied substantially in the same position regardless of the rotation of the can roller so that the first reinforcement layer does not contribute to the capacitance generation for the capacitor. Then, aluminum was evaporated by an apparatus 103 for forming a metal thin film (step 514). The thickness of aluminum evaporated was 300 Å (film resistance of 3Ω/□) (step 515). Thereafter, an apparatus 109 for removing patterning material removed the residual patterning material by heating with a far-infrared radiation heater and a plasma discharge treatment. This procedure was repeated by rotating the can roller 101.

The distance Dw between the pinholes of the apparatus for applying patterning material and the surface where the patterning material is deposited was controlled to be 250–300 µm constantly.

The can roller 101 performed 700 rotations from the start of the deposition for the first reinforcement layer so that the check point was reached (step 516). At this point, the total deposition thickness of the first reinforcement layer was about 260 µm, and when compared with the intended thickness of 340 µm, further deposition of 80 µm was required (step 517). Since the average thickness of the resin layer was 0.6 µm, and the average thickness of the metal thin film layer was 300 Å, the number of depositions to be performed further was determined as 127 (step 518), and the can roller 101 performed 127 further rotations so that the deposition for the first reinforcement layer was completed (steps 519 and 520).

Then, the element layer for serving as a capacitance generation portion for a capacitor was deposited (step 531 in FIG. 13). For the resin layer material, the same material as that for the resin layers in the first protective layer and the first reinforcement layer was used and evaporated so as to be deposited on the first reinforcement layer (step 532). Then, for the apparatus 106 for curing resin, a UV curing device was used, which polymerized and cured the deposited resin layer material to a curing degree of 70%. The thickness of the thus formed resin layer was about 0.4 µm on average (step 533). Thereafter, the surface of the layer was treated with an oxygen plasma using the apparatus 107 for treating a resin layer surface. Then, a patterning material was applied by the apparatus 300 for applying patterning material. According to the method shown in FIG. 5, the patterning material was pre-evaporated by the evaporation apparatus 312 and then supplied to the apparatus 300 for applying patterning material that maintains a temperature of 170° C. For the apparatus for applying patterning material, an apparatus as shown in FIGS. 3 and 4 was used to eject vapor patterning material from circular pinholes with a diameter of 50 µm and a depth of 300 µm so that the patterning material was deposited in the form of a strip. A pre-adjustment had been carried out so that the width of the strip was 150 μm. Then, aluminum was evaporated by an apparatus 103 for forming a metal thin film (step 534). The thickness of aluminum evaporated was 300 Å (film resistance of 3Ω/☐) (step 535). Thereafter, an apparatus 109 for removing patterning material removed the residual patterning material by heating with a far-infrared radiation heater and a plasma discharge treatment. This procedure was repeated by rotating the can roller 101.

The distance Dw between the pinholes of the apparatus for applying patterning material and the surface where the patterning material is deposited was controlled to be 250–300 μm constantly. Further, the position where the patterning material was applied was changed by reciprocating the apparatus for applying patterning material 300 in the direction of arrow 358 (see FIG. 7) in a predetermined distance for each rotation of the can roller 101.

The can roller 101 performed 1800 rotations from the start of the deposition for the element layer so that the check point was reached (step 537). At this point, the electrostatic capacitance Cp of a capacitor that was assumed to be manufactured from the element layer formed up to this point was about 0.39 μF according to formula 1, and when compared with the intended capacitance of 0.47 μF, further deposition for 0.08 μF was required (step 538). Since an increment of the electrostatic capacitance for every deposition of one resin layer was 0.22 nF, the number of depositions to be performed further was determined as 369 (step 539), and the can roller 101 performed 369 further rotations so that the deposition for the element layer was completed (steps 540 and 541).

Then, the second reinforcement layer was deposited on the surface of the element layer (step 511 in FIG. 11). The method for forming the second reinforcement layer was substantially the same as that for the first reinforcement layer (steps 512 to 515). The can roller 101 performed 700 rotations from the start of the deposition for the second reinforcement layer so that the check point was reached (step 516). At this point, the total deposition thickness of the second reinforcement layer was about 270 μm, and when compared with the intended thickness of 340 μm, further deposition of 70 μm was required (step 517). Since the average thickness of the resin layer was 0.6 μm, and the average thickness of the metal thin film layer was 300 Å, the number of depositions to be performed further was determined as 111 (step 518), and the can roller 101 performed 111 further rotations so that the deposition for the second reinforcement layer was completed (steps 519 and 520).

Finally, the second protective layer was deposited on the surface of the second reinforcement layer (step 551 in FIG. 14). The method for forming the second reinforcement layer was substantially the same as that for the first protective layer (steps 552 to 555). The can roller 101 performed 15 rotations so that the check point was reached (step 554). At this point, the total deposition thickness of the second protective layer was about 8 μm, and the total deposition thickness from the start of the deposition was about 1493 μm. When it was compared with the intended total thickness of the capacitor of 1.5 mm, further deposition of 7 μm was required (step 555). Since the average thickness of the resin layer was 0.6 μm, the number of depositions to be performed further was determined as 12 (step 556), and the can roller 101 performed 12 further rotations so that the deposition for the second protective layer was completed (steps 557 and 558).

Then, the obtained cylindrical layered product was cut into 8 segments (by every 45°) and removed, and pressed under heat so that a flat layered product base element 400 as shown in FIG. 8 was obtained. In FIG. 8, arrow 401 indicates the travel direction of the circumferential surface of the can roller 101. The layered product base element was cut at sectional planes 405a and brass was sprayed to the sectional planes to form external electrodes. Furthermore, conductive paste where an alloy of copper, nickel, silver or the like was dispersed in a thermosetting phenol resin was applied to the surface of the sprayed metal and cured by heat. Then, hot solder dipping was performed on the surface of the resin. Thereafter, the layered product base element was cut at sectional planes 405b in FIG. 8 and immersed in a silane coupling agent solution so as to coat the outer surface. Thus, a chip capacitor 410 as shown in FIG. 9 was obtained.

The thus obtained chip capacitor 410 had a capacitance of 0.47 μF, a withstand voltage of 50 V, an outer size of about 1.5 mm thick in the deposition direction and about 1.6 mm deep and about 3.2 mm wide (in the direction of the opposing external electrodes). When the chip capacitor was disassembled to measure the thickness of each layer, the thickness of the first protective layer was 15 μm, the thickness of the first reinforcement layer was 340 μm, the thickness of the second reinforcement layer was 340 μm, and the thickness of the second protective layer was 15 μm. Thus, the capacitance, the entire thickness, and the thickness of each layer matched the originally intended values. Furthermore, no short-circuits between the metal thin film layers and no ruptures in the metal thin film layers were observed.

When the chip capacitor was disassembled to measure the surface roughness Ra of the surface of the resin layer and the surface of the metal thin film in the element layer, they were 0.005 μm and 0.005 μm, respectively, and the surfaces were smooth and had no large protrusions.

The curing degrees of the resin layers in the element layer, the resin layers in the first and second reinforcement layers, and the first and second protective layers were 95%, 95%, and 90%, respectively. The width of margins of the metal thin film layers of the element layer 402 was 150 μm. The width of margins of the metal thin film layers of the first and second reinforcement layers 403a and 403b was 150 μm. The margins were formed with a constant width as intended originally.

Furthermore, the adhesion strength with the external electrodes was sufficient for practical applications.

Example 2

A capacitor was manufactured under the same conditions as those in Example 1 except for the following condition.

In Example 2, at the point when the can roller 101 rotated 1000 times after the start of the deposition for the element layer, a valve 260 for adjusting the flow rate of the apparatus 250 for forming a resin layer was opened slightly so as to increase the thickness per resin layer slightly. Then, the can roller 101 was rotated about 200 times. Thereafter, the valve 260 for adjusting flow rate was closed slightly so as to recover the original flow rate. This operation was performed to assume unexpected variations in the amount of resin layer material evaporated.

Thereafter, the check point was reached at the point when the can roller rotates 1800 times from the start of the deposition for the element layer. The electrostatic capacitance of a capacitor that was assumed to be manufactured from the element layer formed up to this point was 0.37 μF, and compared with the intended capacitance of 0.47 μF. Then, the can roller was rotated 390 further times and thus the deposition for the element layer was completed.

Thereafter, the second reinforcement layer was formed in the same manner as in Example 1. The check point was reached at the point when the can roller rotated 700 times from the start of the deposition for the second reinforcement layer. The total deposition thickness of the second reinforcement layer was 270 μm, and compared with the intended thickness of 340 μm. Then, the can roller was rotated 110 further times and thus the deposition for the second reinforcement layer was completed.

Finally, the second protective layer was formed on the second reinforcement layer in the same manner as in Example 1. The check point was reached at the point when the can roller 101 rotated 15 times from the start of the deposition for the second protective layer. The total deposition thickness of the second protective layer was 8 μm, and the total deposition thickness from the start of the deposition was 1497 μm, which was compared with the intended total thickness of the capacitor of 1.5 mm. Then, the can roller was rotated 5 further times and thus the deposition for the second protective layer was completed.

Thereafter, a chip capacitor was obtained by forming external electrodes in the same manner as in Example 1.

The thus obtained chip capacitor had a capacitance of 0.47 μF, a withstand voltage of 50 V, an outer size of about 1.5 mm thick in the deposition direction and about 1.6 mm deep and about 3.2 mm wide (in the direction of the opposing external electrodes). When the chip capacitor was disassembled to measure the thickness of each layer, the thickness of the first protective layer was 15 μm, the thickness of the first reinforcement layer was 340 μm, the thickness of the second reinforcement layer was 340 μm, and the thickness of the second protective layer was 12 μm. Thus, although there were variations in the thickness of the resin layers in the deposition process of the element layer, the capacitance, the entire thickness, and the thickness of each layer matched the originally intended values. Furthermore, no short-circuits between the metal thin film layers and no ruptures in the metal thin film layers were observed.

Comparative Example 1

A capacitor was manufactured under the same conditions as those in Example 2 except for the following condition.

In Comparative Example 1, unlike Example 2, no check point was provided, and the numbers of depositions for the first protective layer, the first reinforcement layer, the element layer, the second reinforcement layer, and the second protective layer were the same as those in Example 1.

More specifically, the can roller 101 was rotated 30 times so that the first protective layer was formed on the circumferential surface of the can roller 101. Then the can roller 101 was rotated 830 times so that the second reinforcement layer was formed.

Then, the deposition for the element layer started. As in Example 2, at the point when the can roller 101 rotated 1800 times after the start of the deposition for the element layer, a valve 260 for adjusting flow rate of the apparatus 250 for forming a resin layer was opened slightly so as to increase the thickness per resin layer slightly. Then, the can roller 101 was rotated about 200 times. Thereafter, the valve 260 for adjusting flow rate was adjusted so as to recover the original flow rate. Then, at the point when the total number of rotations of the can roller for forming the element layer reached 2200 as in Example 1, the deposition of the element layer was completed.

Thereafter, the second reinforcement layer was formed by rotating the can roller 101 a total of 830 revolutions as in Example 1. Lastly, the second protective layer was formed by rotating the can roller 101 a total of 30 revolutions as in Example 1.

Thereafter, a chip capacitor was obtained by forming external electrodes in the same manner as in Example 2.

The thus obtained chip capacitor had a capacitance of 0.45 μF, a withstand voltage of 50 V, an outer size of about 1.55 mm thick in the deposition direction and about 1.6 mm deep and about 3.2 mm wide (in the direction of the opposing external electrodes). When the chip capacitor was disassembled to measure the thickness of each layer, the thickness of the first protective layer was 15 μm, the thickness of the first reinforcement layer was 340 μm, the thickness of the second reinforcement layer was 340 μm, and the thickness of the second protective layer was 15 μm. Thus, since the thickness of the resin layer was changed to be larger in the process of the deposition of the element layer, unlike in Example 2, the obtained capacitor had a capacitance and a thickness in the deposition direction that were significantly different from the values intended originally.

Example 3

A capacitor was manufactured under the same conditions as those in Example 1 except for the following condition.

In Example 3, at the point when the can roller 101 rotated 1000 times after the start of the deposition for the element layer, the apparatus 300 for applying patterning material was retracted slightly so as to broaden the width of margins. Then, the can roller 101 was rotated about 300 times. Thereafter, the apparatus 300 for applying pattering material was returned to the original position. This operation was performed to assume unexpected variations in the margin width. In this example, unlike Example 1, a camera 153 constantly monitored the formed margin width (step 536 in FIG. 13).

Thereafter, the check point was reached at the point when the can roller 101 rotated 1800 times from the start of the deposition for the element layer. The electrostatic capacitance of the capacitor that was assumed to be manufactured from the element layer formed up to this point was 0.35 μF as a result of formula 2, and compared with the intended capacitance of 0.47 μF. Then, the can roller was rotated 440 further times and thus the deposition for the element layer was completed.

Thereafter, the second reinforcement layer was formed in the same manner as in Example 1. The check point was reached at the point when the can roller rotated 700 times from the start of the deposition for the second reinforcement layer. The total deposition thickness of the second reinforcement layer was 270 μm, and compared with the intended thickness of 340 μm. Then, the can roller was rotated 110 further times and thus the deposition for the second reinforcement layer was completed.

Finally, the second protective layer was formed on the surface of the second reinforcement layer in the same manner as in Example 1. The check point was reached at the point when the can roller 101 rotated 15 times from the start of the deposition for the second protective layer. The total deposition thickness of the second protective layer was 8 μm, and the total deposition thickness from the start of the deposition was 1497 μm, which was compared with the intended total thickness of the capacitor of 1.5 mm. Then, the can roller was rotated 5 further times and thus the deposition for the second protective layer was completed.

Thereafter, a chip capacitor was obtained by forming external electrodes in the same manner as in Example 1.

The thus obtained chip capacitor had a capacitance of 0.47 μF, a withstand voltage of 50 V, an outer size of about 1.5 mm thick in the deposition direction and about 1.6 mm deep and about 3.2 mm wide (in the direction of the opposing external electrodes). When the chip capacitor was disassembled to measure the thickness of each layer, the thickness of the first protective layer was 15 μm, the thickness of the first reinforcement layer was 340 μm, the thickness of the second reinforcement layer was 340 μm, and the thickness of the second protective layer was 12 μm. Thus, although there was variations in the margin width in the deposition process of the element layer, the capacitance, the entire thickness, and the thickness of each layer matched the originally intended values. Furthermore, no short-circuits between the metal thin film layers and no ruptures in the metal thin film layers were observed.

This example shows that, even with unexpected variations in the margin width, a capacitor having predetermined performance can be manufactured by measuring the margin width to calculate the electrostatic capacitance Cp based on formula 2, and determining the number of depositions to be performed further for the element layer based on the calculated capacitance Cp. A capacitor with even higher precision with respect to the electrostatic capacitance can be manufactured by calculating the electrostatic capacitance Cp based on formula 3 in view of the thicknesses of the resin layer and the metal thin film layer in the element layer and determining the number of depositions to be performed further for the element layer based on the calculated capacitance Cp.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing a capacitor comprising the steps of:

depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element;

cutting the capacitor base element; and forming external electrodes, wherein a thickness of each deposited resin layer is measured during the deposition for the first protective layer, a check point is provided at a predetermined point in a process of the deposition for the first protective layer, and a number of layers to be deposited further for the first protective layer is determined, based on the measured thickness of the deposited resin layer and a number of deposited resin layers up to the check point and an intended thickness of the first protective layer.

2. A method for manufacturing a capacitor comprising the steps of:

depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element;

cutting the capacitor base element; and forming external electrodes, wherein a thickness of each deposited resin layer in the element layer is measured during the deposition for the element layer, a check point is provided at a predetermined point in a process of the deposition for the element layer, and a number of layers to be deposited further for the element layer is determined, based on the measured thickness of the resin layers in the element layer and a number of deposited resin layers for the element layer up to the check point and an intended capacitance as a capacitor.

3. A method for manufacturing a capacitor comprising the steps of:

depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element;

cutting the capacitor base element; and forming external electrodes, wherein a width of each margin is measured during the deposition for the element layer, a check point is provided at a predetermined point in a process of the deposition for the element layer, and a number of layers to be deposited further for the element layer is determined, based on an opposing area of the metal thin film layers calculated from the measured width of the margin and a number of deposited resin layers for the element layer up to the check point and an intended capacitance as a capacitor.

4. A method for manufacturing a capacitor comprising the steps of:

depositing a first protective layer, an element layer for generating capacitance as a capacitor, and a second protective layer sequentially on a rotating supporting base; the first protective layer comprising resin layers, the element layer comprising metal thin film layers divided by a margin and resin layers deposited alternately, the second protective layer comprising resin layers, thereby forming a capacitor base element;

cutting the capacitor base element; and forming external electrodes, wherein thicknesses of each deposited metal thin film layer and each deposited resin layer are measured during the deposition, a check point is provided at a predetermined point in a process of the deposition for the second protective layer, and a number of layers to be deposited further for the second protective layer is determined, based on the measured thicknesses of the metal thin film layers and the resin layers and a number of deposited layers up to the check point and an intended thickness of the capacitor.

5. A method for manufacturing a capacitor comprising the steps of:

depositing a first protective layer, a first reinforcement layer, an element layer for generating capacitance as a capacitor, and a second protective layer sequentially on a rotating supporting base; the first protective layer comprising resin layers, the first reinforcement layer comprising metal thin film layers and resin layers deposited alternately, the element layer comprising metal thin film layers divided by a margin and resin layers deposited alternately, the second protective layer comprising resin layers, thereby forming a capacitor base element;

cutting the capacitor base element; and forming external electrodes, wherein thicknesses of each deposited metal thin film layer and each deposited resin layer in the first reinforcement layer are measured during the deposition for the first reinforcement layer, a check point is provided at a predetermined point in a process of the deposition for the first reinforcement layer, and a number of layers to be deposited further for the first reinforcement layer is determined, based on the measured thicknesses of the metal thin film layer and the resin layer in the first reinforcement layer and a number of deposited layers for the first reinforcement layer up to the check point and an intended thickness of the first reinforcement layer.

6. A method for manufacturing a capacitor comprising the steps of:

depositing a first protective layer, an element layer for generating capacitance as a capacitor, a second reinforcement layer, and a second protective layer sequentially on a rotating supporting base; the first protective layer comprising resin layers, the element layer comprising metal thin film layers divided by a margin and resin layers deposited alternately, the second reinforcement layer comprising metal thin film layers and resin layers deposited alternately, the second protective layer comprising resin layers, thereby forming a capacitor base element;

cutting the capacitor base element; and forming external electrodes, wherein thicknesses of each deposited metal thin film layer and each deposited resin layer in the second reinforcement layer are measured during the deposition for the second reinforcement layer, a check point is provided at a predetermined point in a process of the deposition for the second reinforcement layer, and a number of layers to be deposited further for the second reinforcement layer is determined, based on the measured thicknesses of the metal thin film layer and the resin layer in the second reinforcement layer and a number of deposited layers for the second reinforcement layer up to the check point and an intended thickness of the second reinforcement layer.

7. The method for manufacturing a capacitor according to any one of claims 1 to 4 and 6, comprising the step of depositing a first reinforcement layer comprising metal thin film layers and resin layers deposited alternately after depositing the first protective layer and before depositing the element layer.

8. The method for manufacturing a capacitor according to any one of claims 1 to 5, comprising the step of depositing a second reinforcement layer comprising metal thin film layers and resin layers deposited alternately after depositing the element layer and before depositing the second protective layer.

9. The method for manufacturing a capacitor according to any one of claims 1 to 6, wherein a plurality of check points are provided in the process of the deposition.

10. The method for manufacturing a capacitor according to any one of claims 1 to 6, wherein the check point is provided for each rotation of the supporting base.

11. The method for manufacturing a capacitor according to any one of claims 1 to 6, wherein the deposition is performed in a vacuum.

12. The method for manufacturing a capacitor according to any one of claims 1 to 6, wherein the rotating supporting base is a cylindrical drum.

13. The method for manufacturing a capacitor according to any one of claims 1 to 6, wherein resin layer material formed into the resin layer is a reactive monomer resin.

14. The method for manufacturing a capacitor according to claim 13, comprising curing the resin layer material after the resin layer has been formed.

15. The method for manufacturing a capacitor according to claim 14, wherein the resin layer material is cured by at least one of the processes selected from the group consisting of polymerization and cross-linking.

16. The method for manufacturing a capacitor according to any one of claims 1 to 6, wherein a thickness of the resin layer in the element layer is not more than 1 $\mu$m.

17. The method for manufacturing a capacitor according to any one of claims 1 to 6, wherein a thickness of the resin layer in the element layer is not more than 0.7 $\mu$m.

18. The method for manufacturing a capacitor according to any one of claims 1 to 6, wherein a surface roughness of the resin layer in the element layer is not more than 0.1 $\mu$m.

19. The method for manufacturing a capacitor according to any one of claims 1 to 6, wherein the metal thin film layer is deposited by vapor deposition.

20. The method for manufacturing a capacitor according to claim 19, wherein the vapor deposition is electron beam vapor deposition.

21. The method for manufacturing a capacitor according to any one of claims 1 to 6, wherein the metal thin film layer is formed of at least one material selected from the group consisting of aluminum, copper, zinc, nickel, compounds thereof, oxides thereof, and oxides of the compounds.

22. The method for manufacturing a capacitor according to any one of claims 1 to 6, wherein the margin is formed by applying patterning material on a surface of the resin layer after depositing the resin layer and before depositing the metal thin film layer.

23. The method for manufacturing a capacitor according to claim 22, wherein a position where the patterning material is applied is changed in synchronization with rotation of the supporting base.

24. The method for manufacturing a capacitor according to claim 22, wherein the patterning material is applied to a surface of the resin layer in a contactless manner.

25. The method for manufacturing a capacitor according to claim 22, wherein applying the patterning material comprises ejecting evaporated patterning material from pinholes opposing a surface of the resin layer and condensing the patterning material on the surface of the resin layer.

26. The method for manufacturing a capacitor according to claim 22, wherein applying the patterning material comprises ejecting liquid patterning material from pinholes opposing a surface of the resin layer and applying the patterning material on the surface of the resin layer.

27. The method for manufacturing a capacitor according to claim 22, wherein the patterning material comprises at least one oil selected from the group consisting of ester oils, glycol oils, fluorine oils, and hydrocarbon oils.

28. The method for manufacturing a capacitor according to claim 22, comprising removing residual patterning material after depositing the metal thin film layer and before depositing the resin layer.

29. The method for manufacturing a capacitor according to claim 22, comprising surface-treating a surface of the resin layer after depositing the resin layer and before applying patterning material.

* * * * *